(12) United States Patent
Wheeler

(10) Patent No.: US 10,995,443 B2
(45) Date of Patent: May 4, 2021

(54) WASHER/DRYER APPLIANCE COMPRISING WEIGHT SENSING TECHNOLOGY

(71) Applicant: Clarence Wheeler, Atlanta, GA (US)

(72) Inventor: Clarence Wheeler, Atlanta, GA (US)

( * ) Notice: Subject to any disclaimer, the term of this patent is extended or adjusted under 35 U.S.C. 154(b) by 96 days.

(21) Appl. No.: 16/266,112

(22) Filed: May 26, 2019

(65) Prior Publication Data
US 2019/0330784 A1 Oct. 31, 2019

Related U.S. Application Data

(63) Continuation-in-part of application No. 15/919,186, filed on Mar. 12, 2018, now abandoned.

(51) Int. Cl.
*D06F 34/18* (2020.01)
*D06F 39/08* (2006.01)
*D06F 37/26* (2006.01)
*G01G 21/28* (2006.01)
*D06F 103/02* (2020.01)

(52) U.S. Cl.
CPC ............ *D06F 34/18* (2020.02); *D06F 37/261* (2013.01); *D06F 39/087* (2013.01); *G01G 21/28* (2013.01); *D06F 2103/02* (2020.02); *D06F 2202/10* (2013.01); *D06F 2212/02* (2013.01)

(58) Field of Classification Search
CPC ...... D06F 34/18; D06F 37/261; D06F 39/087; D06F 2103/02; D06F 2202/10; D06F 2212/02; D06F 33/00; D06F 33/30; D06F 33/32; D06F 17/10; D06F 2103/04; G04G 21/28
USPC ......................... 177/132, 60; 68/12.01, 12.04
See application file for complete search history.

(56) References Cited

U.S. PATENT DOCUMENTS

| | | | | |
|---|---|---|---|---|
| 5,165,260 | A * | 11/1992 | Geiger | D06F 58/30 68/12.04 |
| 5,701,624 | A * | 12/1997 | Shin | D06F 35/006 8/159 |
| 2011/0192655 | A1* | 8/2011 | Kim | D06F 37/12 177/1 |
| 2011/0271719 | A1* | 11/2011 | Fujitsuka | D06F 37/04 68/134 |
| 2013/0239336 | A1* | 9/2013 | Kim | D06F 33/00 8/137 |
| 2017/0350057 | A1* | 12/2017 | Nakamoto | D06F 37/36 |
| 2018/0002859 | A1* | 1/2018 | Hombroek | D06F 34/18 |
| 2019/0292706 | A1* | 9/2019 | De Luca | D06F 58/30 |

* cited by examiner

*Primary Examiner* — Justin M Jonaitis

(57) ABSTRACT

The present invention discloses an washing/dryer appliance. The present invention further comprises a load capacity sensing apparatus coupled within an predetermine region of the cabinet which may sensing the load capacity of the inner drum. And an plurality of electric motors that may raise and lower the outer drum during one operational task of the appliance.

10 Claims, 19 Drawing Sheets

PRIOR ARTS

PRIOR ARTS

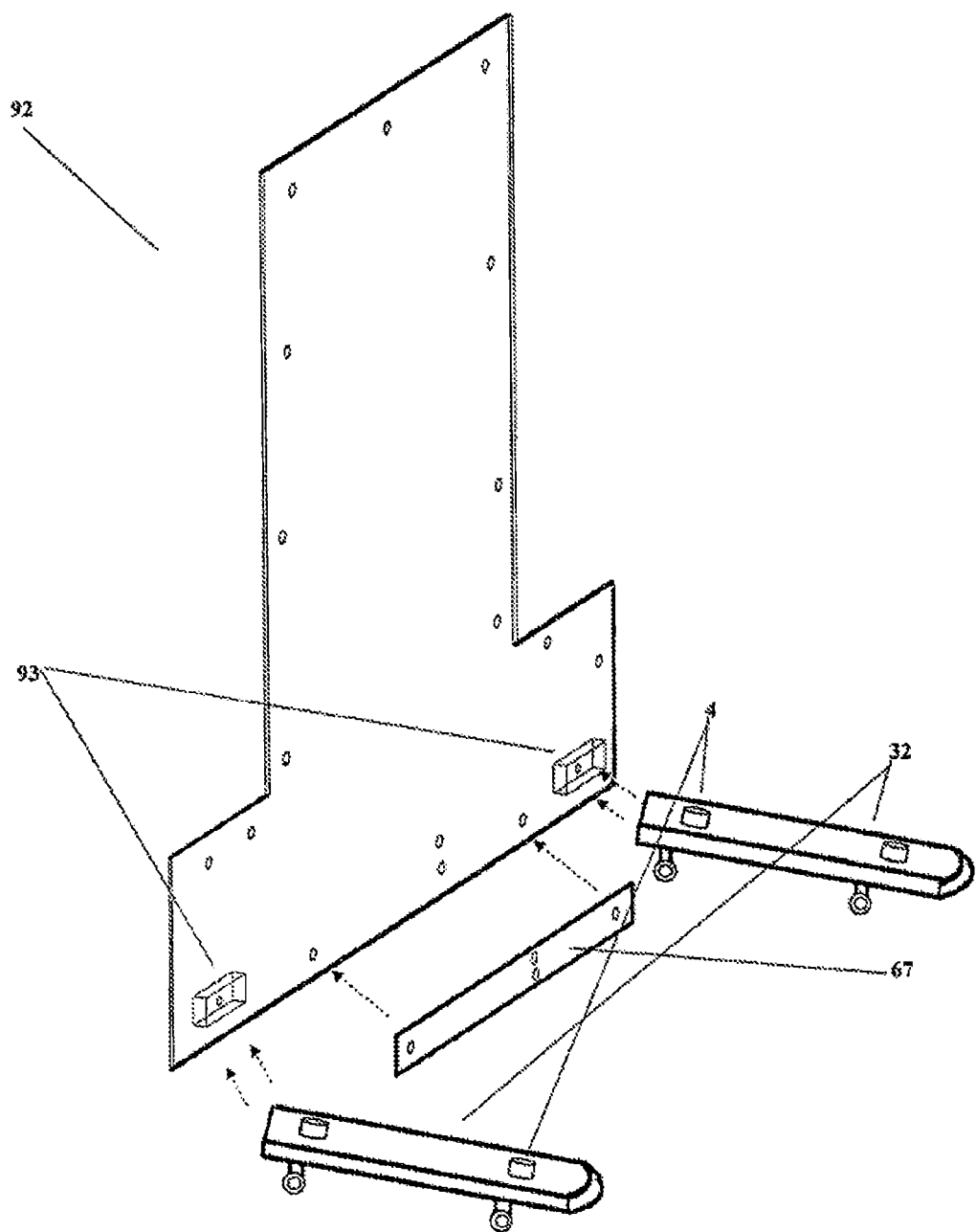

WASHER/DRYER APPLIANCE COMPRISING WEIGHT SENSING TECHNOLOGY

CROSS-REFERENCES TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

Field of the Invention

This invention relates to the field of washer/dryer appliances. More specifically, the invention comprises an improved home appliance which traditionally upgrades conventional washer/dryer appliances and system comprising weight sensing technology.

Description of the Related Art

Modernly and conventionally there are many different type of washing/drying appliances which may preform different operations such as load capacity sensing, surface detection, detergent detection etc., and may further comprise a plurality of components to perform such duties. The appliance may comprise an outer drum and inner drum which houses articles to be washed/dried and washing detergent. More of, the appliance may comprises a pulsator which generates a swirl-shaped liquid in the spin tub.

According to U.S. Pat. No. 5,718,130 shown in FIG. 1A and FIG. 1B, washing/drying machine 200 of the present invention includes a housing 210 and an upper frame 205 mounted on an upper portion of housing 210. Upper frame 205 is formed at its side wall with a first air inlet 209 for guiding an air located at the exterior of washing/drying machine 200 into washing/drying machine 200. An outer tub 220 for receiving a washing liquid is disposed in housing 210. Enclosed within outer tub 220 is a spin tub 230 which is formed at its side wall with a plurality of discharging holes 232. In addition, an air guide 150 for guiding the air into the interior of washing/drying machine 200 is attached to a predetermined position on an inside wall of upper frame 205. Generally, air guide 150 is made of a heat-resistant plastic material and is coupled to the inside wall of upper frame 205 by means of a screw. A first end of air guide 150 is screw-coupled to the inside wall of upper frame 205, and is formed with a second air inlet 160 which is positioned in a position corresponding to first air inlet 209. In addition, a second end of air guide 150 extends up to a space formed between outer tub 220 and spin tub 230. The second end of air guide 150 is provided with an air port 270 which extends towards a lower portion of outer tub 220 by a predetermined length so as to exhaust a heated air towards a bottom wall of outer tub 220. Air guide 150 is provided therein with a blower 180, which sucks the air from the exterior of washing/drying machine 200 and then blows the air into the interior of washing/drying machine 200, and a heater 190 for heating the air which has blown by blower 180. Preferably, blower 180 includes a ceramic heater. At a predetermined position in upper frame 205, there is provided an exhaust hole (not shown) for exhausting the heated air. An air guiding plate 60 is mounted on a lower portion of spin tub 230, and a blowing fan 50 for blowing the heated air towards spin tub 230 is positioned below air guiding plate 60.

Referring to FIG. 1B, air guiding plate 60 is formed with a plurality of air guiding holes 62, and is formed at a center thereof with an annular recess 68. In addition, an annular groove 66, which is communicated with air guiding holes 62 in order to guide the heated air towards the articles placed in spin tub 230, is formed at a lower portion of air guiding plate 60. A pulsator 260 is rotatably accommodated within annular recess 68, and is formed at an upper surface thereof with a plurality of bores 262 which guide some of the heated air into a center portion of spin tub 230. Pulsator 260 has a first center hole 264 at a center thereof. In order to permit pulsator 260 to rotate, a diameter of annular recess 68 is larger than an outer diameter of pulsator 260. Blowing fan 50 has a plurality of blades 54 in order to suck and blow the heated air which has guided by air guide 150. Blowing fan 50 is provided at its top with a cover plate 56, and is provided at its bottom with an annular strip 57 having an air suction hole 58. Blowing fan 50 has a second center hole 52 at a center thereof. Cover plate 56 permits the heated air, which has sucked through air suction hole 58, to blow out towards the side wall of air guiding plate 60. In addition, disposed below outer tub 220 Eire a motor 240 for generating a driving force, and a gear assembly 250 which transfers the driving force of motor 240 to spin tub 230 or to pulsator 260. A spraying nozzle assembly 100 for spraying the washing liquid into spin tub 230 is mounted on an upper portion of outer tub 220. In addition, installed at a bottom wall of housing 210 is a circulation pump 170 which is connected to outer tub 220 in order to circulate the washing liquid into spraying nozzle assembly 100, or in order to drain the washing liquid through a drain tube 174 out of washing/drying machine 200. Motor 240 has a motor shaft 242 which is formed at its lower end with a first pulley 243. Gear assembly 250 has a rotating shaft 252 which is formed at its lower end with a second pulley 254. Second pulley 254 is connected to first pulley 243 by a belt 244 in such a manner that the rotational force of motor 240 can be transmitted to gear assembly 250. In addition, a rotating plate 258 is fixedly attached to an under surface of spin tub 230, and a connection member 256, which is fixedly coupled to rotating plate 258, is provided at an upper portion of gear assembly 250.

Connected to an upper portion of connection member 256 is a pulsator rotating shaft 284. Pulsator rotating shaft 284 is fixedly inserted into first center hole 264 of pulsator 260 through second center hole 52 of blowing fan 50. In order to guide the heated air into spin tub 230, spin tub 230 is formed at its bottom wall with a perforation hole 234, and rotating plate 258 is formed with an aperture 259 which is communicated with perforation hole 234. In the washing cycle, gear assembly 250 transfers the rotational force of motor 240 to pulsator 260 through pulsator rotating shaft 284. In the dehydrating cycle, gear assembly 250 transfers the rotational force of motor 240 to spin tub 230 through connection member 256 and rotating plate 258. In addition, circulation pump 170 has a pump motor (not shown) therein and is connected to outer tub 220 through a discharging tube 172 so as to receive the washing liquid from outer tub 220. Circulation pump 170 is also connected to spraying nozzle assembly 100 through a circulation tube 176 so that the circulated washing liquid is sprayed into spin tub 230.

Washing/drying machine 200 having the construction as described above operates as follows. Firstly, when a user pushes an operating switch 207 installed on upper frame 205, the washing liquid is introduced from a liquid source into outer tub 220 until a liquid level in outer tub 520 reaches a predetermined level. Then, when the liquid level in outer tub 220 reaches the predetermined liquid level, a liquid feed control valve (not shown) blocks a liquid feeding pipe, so the washing liquid stops being supplied to outer tub 220. At the same time, motor 240 rotates in the forward and reverse directions. The rotational force of motor 240 is transmitted to pulsator 260 by way of motor shaft 242, first pulley 243, belt 244, second pulley 254, gear assembly 250, and pulsator rotating shaft 284. As a result, pulsator 260 rotates in the forward and reverse directions, thereby washing the articles. At this time, blowing fan 50 which is coupled to pulsator rotating shaft 284 also rotates together with pulsator 260, thereby a strong liquid flow is created in spin tub 230. At the same time, an operating signal is transmitted to the pump motor accommodated in circulation pump 170 in accordance with a predetermined algorithm so that the pump motor rotates in the forward direction. When the pump motor rotates in the forward direction, a first valve disposed between circulation pump 170 and circulation tube 176 is opened and a second valve disposed between circulation pump 170 and drain tube 174 is closed. In addition, as the pump motor operates, circulation pump 170 also operates, so that some of the washing liquid that has been introduced into outer tub 220 is discharged from outer tub 220 into circulation pump 170 through discharging tube 172. Upon receiving the washing liquid, circulation pump 170 compresses the washing liquid and circulates the washing liquid through circulation tube 176 into spraying nozzle assembly 100 mounted on the upper portion of outer tub 220. Spraying nozzle assembly 100 strongly sprays the compressed washing liquid onto the articles, so that the washing efficiency is improved without wasting any washing liquid. When the washing cycle has finished, the pump motor rotates in the reverse direction. At this time, the first valve disposed between circulation pump 170 and circulation pump 176 is closed, and the second valve disposed between circulation pump 170 and drain tube 174 is opened.

Accordingly, the washing liquid filled in outer tub 220 is drained out of washing/drying machine 200 by way of discharging tube 172, circulation pump 170, and drain tube 174. Then, the dehydrating cycle begins. While the dehydrating cycle is being executed, the articles placed in spin tub 230 are forced towards the side wall of spin tub 230 due to a centrifugal force applied thereto, so the washing liquid contained in the articles is drained out of washing/drying machine 200 through discharging holes 232.

When the dehydrating cycle has finished, a microcomputer accommodated in washing/drying machine 200 sends operating signals to blower 180 and heater 190 disposed within air guide 150. At the same time, the microcomputer sends an operating signal to motor 240 so as to rotate blowing fan 50. As a result, the air is introduced into air guide 150 from the exterior of washing/drying machine 200 through first air inlet 209 and second air inlet 160. Then, the air which has been introduced into air guide 150 is heated while it passes through heater 190, and, as shown by an arrow 175 in FIG. 1A, the heated air exhausts towards the bottom wall of outer tub 220 through airport 270 which is provided at the second end of air guide 150. Then the heated air is introduced into spin tub 230 through aperture 259 of rotating plate 258 and through perforation hole 234 of spin tub 230. After that, the heated air which has been introduced into spin tub 230 is sucked into blowing fan 50 through air suction hole 58 formed at the underside of blowing fan 50 and is blown out towards the side wall of spin tub 230. Accordingly, the heated air passes through annular groove 66 formed at a periphery of air guiding plate 60 and through air guiding holes 62, and thereby makes contact with the articles. As mentioned above, since the articles are closely adhered to the side wall of spin tub 230, the heated air which is blown out towards the side wall of spin tub 230 can sufficiently make contact with the articles. In addition, since some of the heated air is blown towards the center of spin tub 230 through bores 262 formed in pulsator 260, the heated air can evenly make contact with all of the articles even when some of the articles remain in the center of spin tub 230. As the heated air makes contact with the articles, the liquid contained in the articles evaporates while generating a water vapor, and the water vapor exhausts out of washing drying machine 200 through the exhaust hole formed at the predetermined position on upper frame 205.

BRIEF SUMMARY OF THE PRESENT INVENTION

The scope of the present invention relates to washing/drying appliances. The present invention has been made to overcome the above described problems of the prior arts, and accordingly, it is an object of the present invention to provide a washing/drying machine which comprises an pulsator arranged within an predetermine region of the inner cabinet which comprises an plurality of spring induction holes and spring induction caps which may be used to allocate the pulsator to marginally flex downwardly to apply an force upon the load capacity sensing apparatus for sensing the load capacity of articles stored within the inner drum portion thereby providing an more precise solution to determine the load capacity of articles within the inner drum. The appliance may further comprise an plurality of motor(s) (e.g., DC motors) coupled within an predetermine region of the inner cabinet and the outer drum envisioned to raise/lower the outer drum to and from the load capacity sensing apparatus to obtain load capacity data depending on one mode of the appliance. For instance, when an user selects load capacity sensing mode the appliance controller sends an signal to the motor(s) to rotate at an predetermine direction in response lowering the outer drum onto the load capacity sensing apparatus, further the load capacity sensing apparatus transmits an return signal to the appliance controller reveling the sensed outer drum load capacity (e.g., weight) which is further shown on the appliance display. Further, when the user chooses to opt out of load capacity sensing mode the appliance controller distributes an signal to the motor(s) to rotate at an predetermine direction in response raising the outer drum from the load capacity sensing apparatus. In conclusion, the present invention provide a solution that overcomes the shortcomings of determining the load capacity of articles that are stored within the inner drum of an appliance.

According to FIG. 1A-1B, show a prior arts of a conventional washing/drying machine of U.S. Pat. No. 5,718,130 used in reference herein, washing/drying machine 200 of the present invention includes a housing 210 and an upper frame 205 mounted on an upper portion of housing 210. Upper frame 205 is formed at its side wall with a first air inlet 209 for guiding an air located at the exterior of washing/drying machine 200 into washing/drying machine 200. An outer tub 220 for receiving a washing liquid is disposed in housing 210.

Enclosed within outer tub 220 is a spin tub 230 which is formed at its side wall with a plurality of discharging holes 232. In addition, an air guide 150 for guiding the air into the interior of washing/drying machine 200 is attached to a predetermined position on an inside wall of upper frame 205. Generally, air guide 150 is made of a heat-resistant plastic material and is coupled to the inside wall of upper frame 205 by means of a screw. A first end of air guide 150 is screw-coupled to the inside wall of upper frame 205, and is formed with a second air inlet 160 which is positioned in a position corresponding to first air inlet 209. In addition, a second end of air guide 150 extends up to a space formed between outer tub 220 and spin tub 230. The second end of air guide 150 is provided with, airport 270 which extends towards a lower portion of outer tub 220 by a predetermined length so as to exhaust a heated air towards a bottom wall of outer tub 220. Air guide 150 is provided therein with a blower 180, which sucks the air from the exterior of washing/drying machine 200 and then blows the air into the interior of washing/drying machine 200, and a heater 190 for heating the air which has blown by blower 180. Preferably, blower 180 includes a ceramic heater. At a predetermined position in upper frame 205, there is provided an exhaust hole (not shown) for exhausting the heated air. An air guiding plate 60 is mounted on a lower portion of spin tub 230, and a blowing fan 50 for blowing the heated air towards spin tub 230 is positioned below air guiding plate 60.

Referring to FIG. 1B, air guiding plate 60 is formed with a plurality of air guiding holes 62, and is formed at a center thereof with an annular recess 68. In addition, an annular groove 66, which is communicated with air guiding holes 62 in order to guide the heated air towards the articles placed in spin tub 230, is formed at a lower portion of air guiding plate 60. A pulsator 260 is rotatably accommodated within annular recess 68, and is formed at an upper surface thereof with a plurality of bores 262 which guide some of the heated air into a center portion of spin tub 230. Pulsator 260 has a first center hole 264 at a center thereof. In order to permit pulsator 260 to rotate, a diameter of annular recess 68 is larger than an outer diameter of pulsator 260. Blowing fan 50 has a plurality of blades 54 in order to suck and blow the heated air which has guided by air guide 150. Blowing fan 50 is provided at its top with a cover plate 56, and is provided at its bottom with an annular strip 57 having an air suction hole 58. Blowing fan 50 has a second center hole 52 at a center thereof cover plate 56 permits the heated air, which has sucked through air suction hole 58, to blow out towards the side wall of air guiding plate 60. In addition, disposed below outer tub 220 are a motor 240 for generating a driving force, and a gear assembly 250 which transfers the driving force of motor 240 to spin tub 230 or to pulsator 260. A spraying nozzle assembly 100 for spraying the washing liquid into spin tub 230 is mounted on an upper portion of outer tub 220. In addition, installed at a bottom wall of housing 210 is a circulation pump 170 which is connected to outer tub 220 in order to circulate the washing liquid into spraying nozzle assembly 100, or in order to drain the washing liquid through a drain tube 174 out of washing/drying machine 200. Motor 240 has a motor shaft 242 which is formed at its lower end with a first pulley 243. Gear assembly 250 has a rotating shaft 252 which is formed at its lower end with a second pulley 254. Second pulley 254 is connected to first pulley 243 by a belt 244 in such a manner that the rotational force of motor 240 can be transmitted to gear assembly 250. In addition, a rotating plate 258 is fixedly attached to an under surface of spin tub 230, and a connection member 256, which is fixedly coupled to rotating plate 258, is provided at an upper portion of gear assembly 250. Connected to an upper portion of connection member 256 is a pulsator rotating shaft 284.

Pulsator rotating shaft 284 is fixedly inserted into first center hole 264 of pulsator 260 through second center hole 52 of blowing fan 50. In order to guide the heated air into spin tub 230, spin tub 230 is formed at its bottom wall with a perforation hole 234, and rotating plate 258 is formed with an aperture 259 which is communicated with perforation hole 234. In the washing cycle, gear assembly 250 transfers the rotational force of motor 240 to pulsator 260 through pulsator rotating shaft 284. In the dehydrating cycle, gear assembly 250 transfers the rotational force of motor 240 to spin tub 230 through connection member 256 and rotating plate 258. In addition, circulation pump 170 has a pump motor (not shown) therein and is connected to outer tub 220 through a discharging tube 172 so as to receive the washing liquid from outer tub 220. Circulation pump 170 is also connected to spraying nozzle assembly 100 through a circulation tube 176 so that the circulated washing liquid is sprayed into spin tub 230. Washing/drying machine 200 having the construction as described above operates as follows. Firstly, when a user pushes an operating switch 207 installed on upper frame 205, the washing liquid is introduced from a liquid source into outer tub 220 until a liquid level in outer tub 520 reaches a predetermined level. Then, when the liquid level in outer tub 220 reaches the predetermined liquid level, a liquid feed control valve (not shown) blocks a liquid feeding pipe, so the washing liquid stops being supplied to outer tub 220.

At the same time, motor 240 rotates in the forward and reverse directions. The rotational force of motor 240 is transmitted to pulsator 260 by way of motor shaft 242, first pulley 243, belt 244, second pulley 254, gear assembly 250, and pulsator rotating shaft 284. As a result pulsator 260 rotates in the forward and reverse directions, thereby washing the articles. At this time, blowing fan 50 which is coupled to pulsator rotating shaft 284 also rotates together with pulsator 260, thereby a strong liquid flow is created in spin tub 230. At the same time, an operating signal is transmitted to the pump motor accommodated in circulation pump 170 in accordance with a predetermined algorithm so that the pump motor rotates in the forward direction. When the pump motor rotates in the forward direction, a first valve disposed between circulation pump 170 and circulation tube 176 is opened and a second valve disposed between circulation pump 170 and drain tube 174 is closed. In addition, as the pump motor operates, circulation pump 170 also operates, so that some of the washing liquid that has been introduced into outer tub 220 is discharged from outer tub 220 into circulation pump 170 through discharging tube 172. Upon receiving the washing liquid, circulation pump 170 compresses the washing liquid and circulates the washing liquid through circulation tube 176 into spraying nozzle assembly 100 mounted on the upper portion of outer tub 220.

Spraying nozzle assembly 100 strongly sprays the compressed washing liquid onto the articles, so that the washing efficiency is improved without wasting any washing liquid. When the washing cycle has finished, the pump motor rotates in the reverse direction. At this time, the first valve disposed between circulation pump 170 and circulation pump 176 is closed, and the second valve disposed between circulation pump 170 and drain tube 174 is opened.

Accordingly, the washing liquid filled in outer tub 220 is drained out of washing/drying machine 200 by way of discharging tube 172, circulation pump 170, and drain tube 174. Then, the dehydrating cycle begins. While the dehydrating cycle is being executed, the articles placed in spin tub 230 are forced towards the side wall of spin tub 230 due to a centrifugal force applied thereto, so the washing liquid contained in the articles is drained out of washing/drying machine 200 through discharging holes 232.

When the dehydrating cycle has finished, a microcomputer accommodated in washing/drying machine 200 sends operating signals to blower 180 and heater 190 disposed within air guide 150. At the same time, the microcomputer sends an operating signal to motor 240 so as to rotate blowing fan 50. As a result, the air is introduced into air guide 150 from the exterior of washing/drying machine 200 through first air inlet 209 and second air inlet 160. Then, the air which has been introduced into air guide 150 is heated while it passes through heater 190, and, as shown by an arrow 175 in FIG. 1A, the heated air exhausts towards the bottom wall of outer tub 220 through airport 270 which is provided at the second end of air guide 150. Then, the heated air is introduced into spin tub 230 through aperture 259 of rotating plate 258 and through perforation hole 234 of spin tub 230. After that, the heated air which has been introduced into spin tub 230 is sucked into blowing fan 50 through air suction hole 58 formed at the underside of blowing fan 50 and is blown out towards the side wall of spin tub 230. Accordingly, the heated air passes through annular groove 66 formed at a periphery of air guiding plate 60 and through air guiding holes 62, and thereby makes contact with the articles. As mentioned above, since the articles are closely adhered to the side wall of spin tub 230, the heated air which is blown out towards the side wall of spin tub 230 can sufficiently make contact with the articles. In addition, since some of the heated air is blown towards the center of spin tub 230 through bores 262 formed in pulsator 260, the heated air can evenly make contact with all of the articles even when some of the articles remain in the center of spin tub 230. As the heated air makes contact with the articles, the liquid contained in the articles evaporates while generating a water vapor, and the water vapor exhausts out of washing drying machine 200 through the exhaust hole formed at the predetermined position on upper frame 205.

BRIEF DESCRIPTION OF THE SEVERAL VIEWS OF THE DRAWINGS

FIG. 4A-4G is an perspective view of the appliance according to one embodiment.

DETAILED DESCRIPTION OF THE PREFERRED EMBODIMENT(S)

Figure 1A:
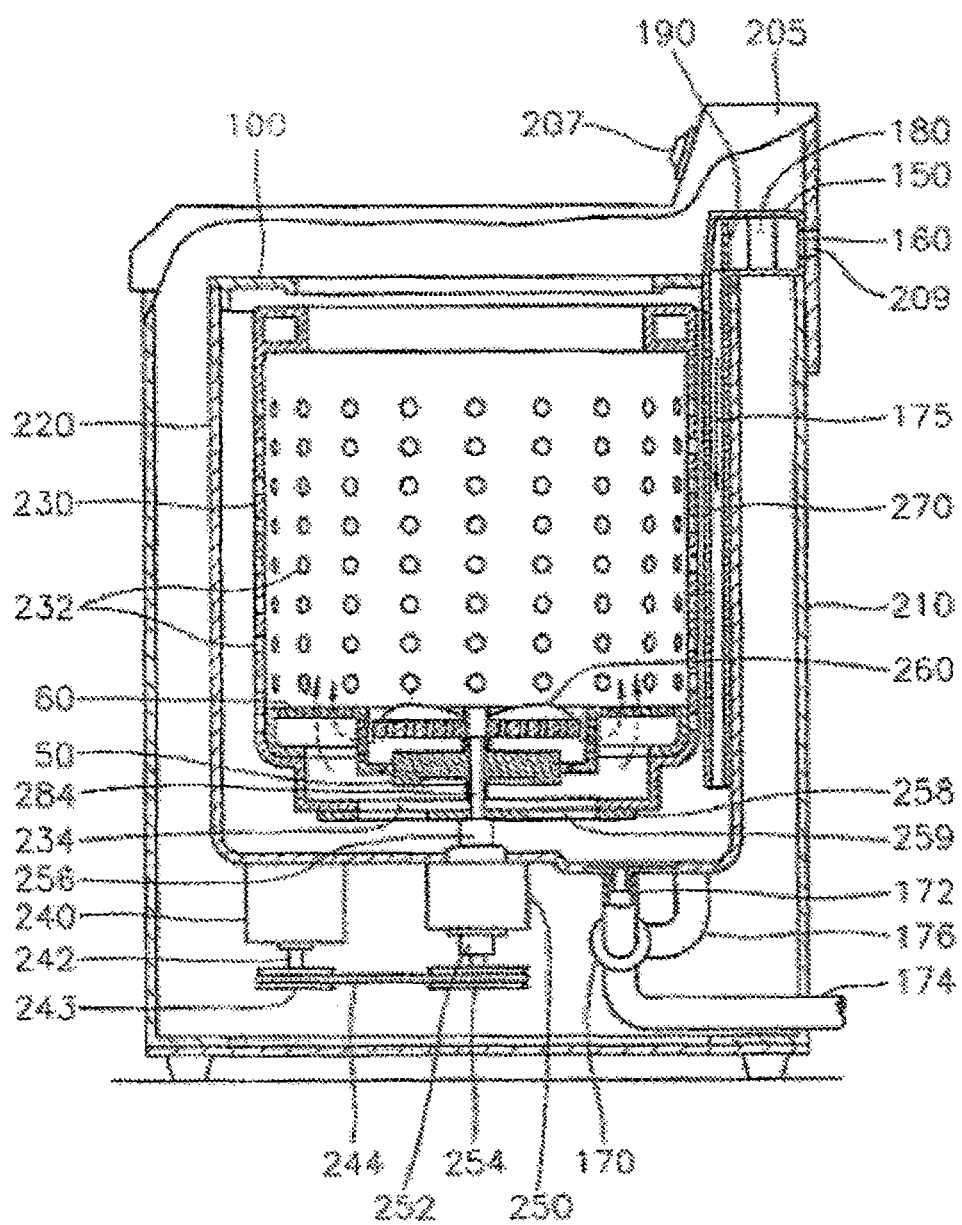
FIG. 1A-1B is a perspective view showing the structure of a conventional (prior-arts) washing/drying machine appliance and pulsator.
Figure 1B:
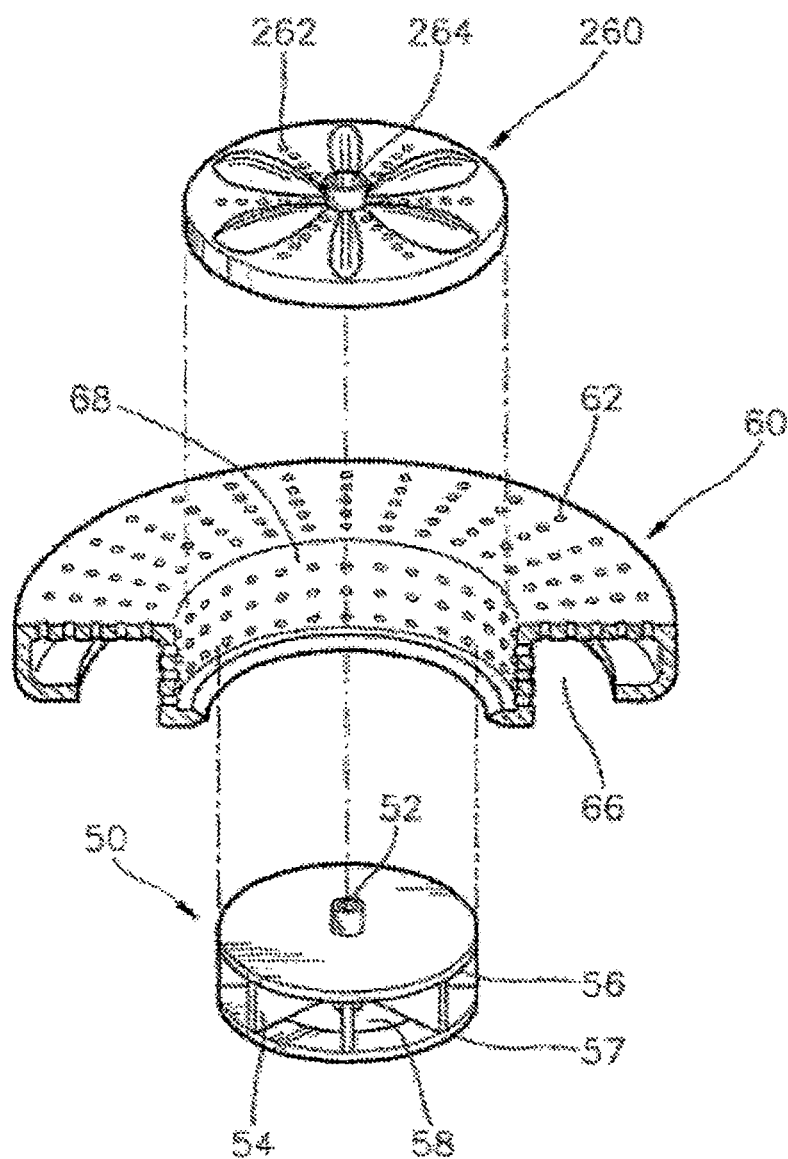

A description of FIGS. 1A and 1B was given earlier in connection with the description of the state of the art.

Figure 2:
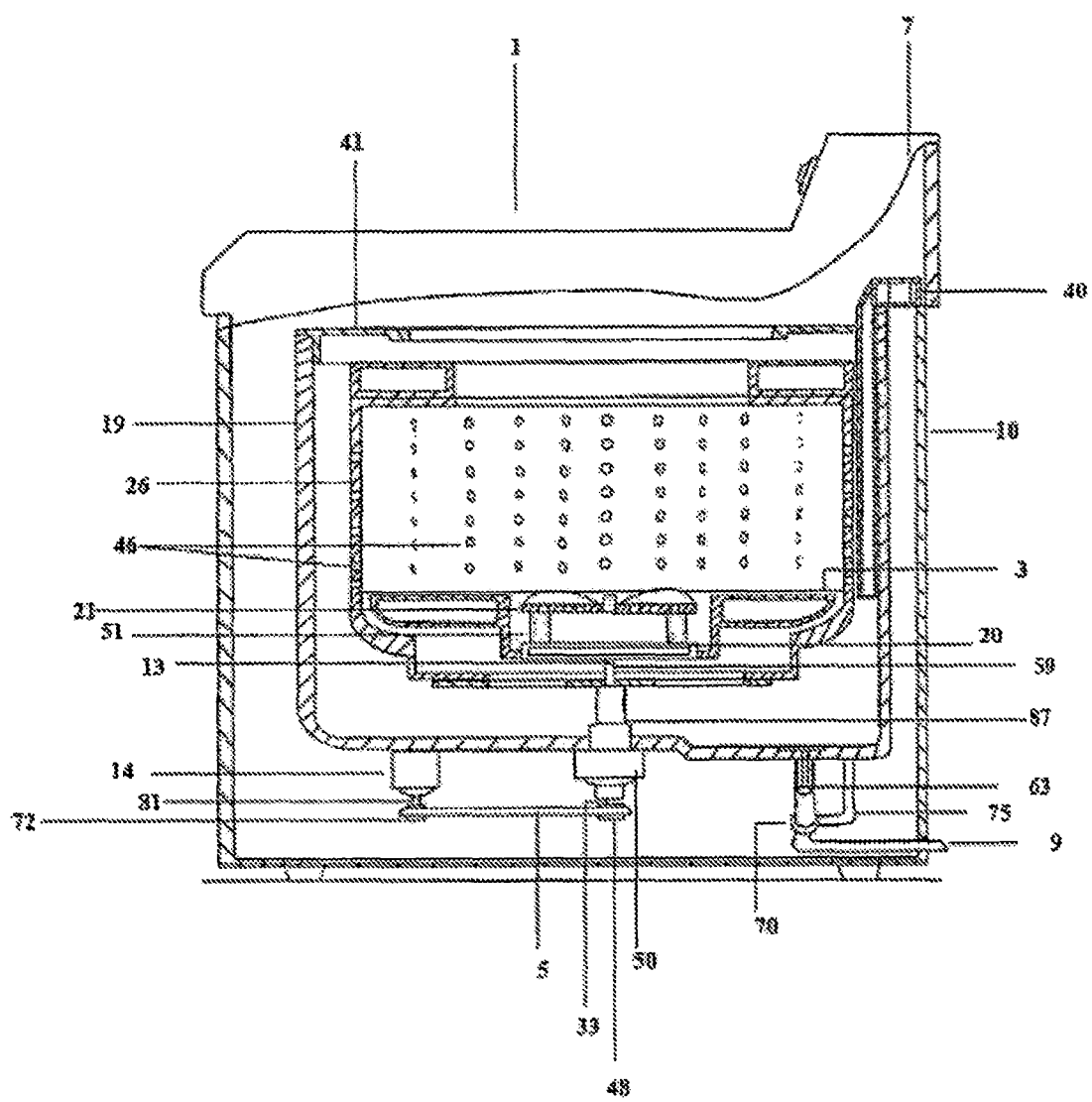
FIG. 2 is an perspective view of the washing/drying machine appliance according to one embodiment.

Referring to FIG. 2, an washer/dryer appliance 1 consists of a cabinet 10 comprising at least one laundry entrance such as an door arranged at its top-side to allocate an user to insert articles into the laundry entrance, and an upper frame 7 formed at the cabinet 10 side wall. The appliance 1 comprises an outer drum portion 19 (e.g., such as the tub) disposed within the cabinet 10 which may traditionally store water and washing liquid therein, and an inner drum portion 26 (e.g., such as the drum) comprising an plurality of discharging holes 46 rotatably provided within the outer drum portion 19, and an motor 14 below the outer drum 19 but within cabinet 10 for generating a driving force, and a gear assembly 50 which transfers the driving force from the motor 14 to spin the inner drum 26, or to the pulsator 21 rotatably mounted on a bottom wall of the inner drum 26. The motor device 14 is connected to the gear assembly 50 through a belt 5.

The appliance 1 comprises a spraying nozzle assembly 41 for spraying washing liquids into the inner drum 26 mounted on an upper portion of the outer drum 19. Assembled at a bottom wall of the cabinet 10 is a circulation pump 70 which is connected to the outer drum 19 which may circulate washing liquids into the spraying nozzle assembly 41, or in order to drain the washing liquids through the drain tube 9 out of the appliance 1.

Further, the circulation pump 70 is connected to both the outer drum 19 and to the spraying nozzle assembly 41 through a discharging tube 63 and a circulation tube 75 in order to circulate washing liquids into the spray nozzle assembly 41, or otherwise drain washing liquids and water through the drain tube 9.

The appliance 1 comprises an air guide 40 for guiding the air into the interior of the appliance 1 is coupled to a predetermined position on an inside wall of the upper frame 7. Generally, the air guide 7 is made of a heat-resistant plastic material and is coupled to the inside wall of the upper frame 7 by means of a screw or another suitable coupling method. A first end of the air guide 40 is coupled to the inside wall of the upper frame 7. In conclusion, the appliance 1 further comprises an air guiding plate 3 mounted on an base portion of the inner tub 26 which is traditionally used to allocate air flow towards the inner tub 26.

Further, the motor device 14 composes a respective motor shaft 81 and pulley 72 arranged at its lower region. The gear assembly 50 comprises a respective rotating shaft 33 and pulley 48 formed at its lower end. In sequence, the gear assembly 50 pulley 48 is connected to the motor device 14 pulley 72 by a belt 5 whereas the rotational force of the motor device 14 can be transmitted to the gear assembly 50. The appliance 1 comprises an joining member 87 disposed at an upper region of the gear assembly 50, further the joining member 87 comprises an load capacity sensing apparatus rotating shaft 59 coupled to an upper portion of its body. The joining member 87 load capacity sensing apparatus rotating shaft 59 is respectively introduced into the load capacity sensing apparatus 20 base center hole 13. During operations of the washing cycles, the gear assembly 50 distributes a rotational force from the motor device 14 to the pulsator 20 via the load capacity sensing apparatus rotating shaft 59 in conjunction with the load capacity sensing component 20 being respectively coupled to the pulsator 20.

Figure 3:
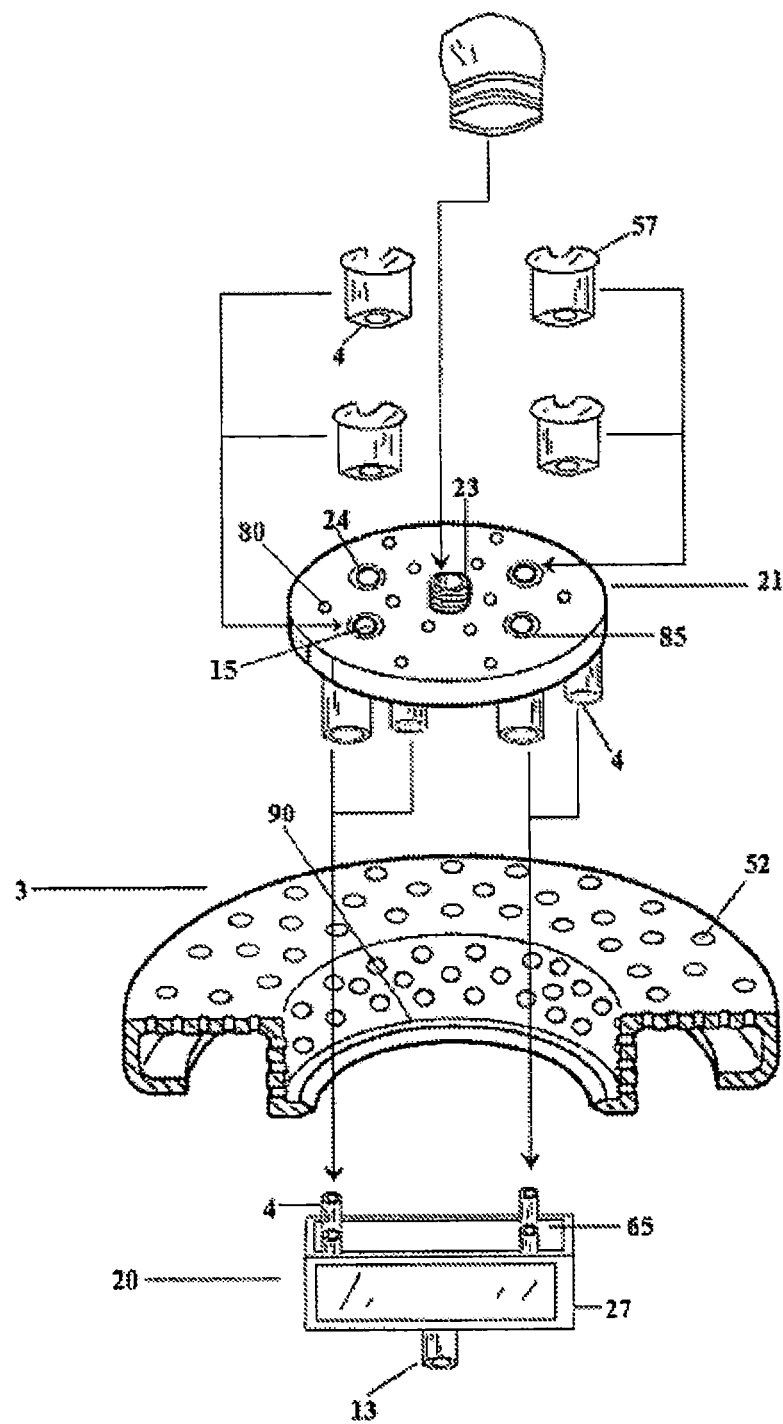
FIG. 3 is an perspective view of the pulsator, air guiding plate and load capacity sensing apparatus according to another embodiment.

According to FIG. 3 shows the air guiding plate 3, pulsator 21 and load capacity sensing apparatus 20. The air guiding plate 3 is respectively formed comprising an plurality of air guiding holes 52 throughout its circumference, and is formed at a center region of the inner portion of the inner drum 26 thereof comprising an annular recess 90.

The inner drum 26 comprises an pulsator 21 respectively rotatably accommodated within the annular recess 90 region, and further arranged at an upper surface thereof with a plurality of bores 80 which guides some of the air flow into a center region of the inner drum 26. The pulsator 21 includes an first center hole 23 at an center region of its body thereof, in addition an portion of the first center hole 23 outer circumference is threaded which may allocate the pulsator 21 center cap 69 to couple thereon. The pulsator 21 comprises a plurality of spring induction hole(s) 15 throughout its top outer circumference respectively spaced slightly adjacent each other at opposing regions that forms a quadrilateral formation around the first center hole 23. The spring induction hole(s) 15 comprises an partial annular recess region 85, and an partial lip 24 that flanges inward toward the spring induction hole 15 opening so that the spring induction cap(s) 57 edges rest thereon the spring induction hole(s) 15 lip 24 region. The spring induction hole(s) 15 are formed as a quadrilateral, spherical or elliptical shape. More of, the pulsator 21 comprises an plurality of spring induction cap(s) 57 that respectively corresponds and arrange within the spring induction hole(s) 15. Further, the spring induction cap(s) 57 comprises an U-shape cut-out region at one predetermine region of its edges that forms an partial gap between the spring induction cap(s) 57 edges and the spring induction hole(s) 15 edges, envisioned to allocate an user to remove the spring induction end cap(s) 57 in response to inserting an object (e.g., tool) to pry the apart the spring induction end cap(s) 57 from the spring induction hole(s) 15. Additionally, the underneath region of each spring induction cap(s) 57 comprises an spring slot(s) 4, further the spring induction cap(s) 57 spring slot(s) 4 forms an circular shape opening that slightly protrude downward in direction away from the spring induction cap(s) 57 body, envisioned to houses an top region of the coil spring(s) 51. The diameter of the spring induction cap(s) 57 spring slot(s) 4 is marginally smaller than the overall diameter of the coil spring(s) 51. In conclusion, the diameter of the annular recess 90 is larger them the outer diameter of the pulsator 21, whereas in response will allocate the pulsator 21 to rotate spontaneously.

The appliance 1 further houses a load capacity sensing apparatus 20 respectively coupled to but arrange below the pulsator 21, the load capacity sensing apparatus 20 may be the likes of a digital scale. More specifically, the load capacity sensing apparatus 20 may comprises of components and developments as the likes of U.S. application Ser. No. 09/360,331 and U.S. Pat. No. 5,886,302 for example.

Additionally, the top region of the load capacity sensing apparatus 20 platform 65 comprises an plurality of spring slot(s) 4, further the platform 65 spring slot(s) 4 forms an circular shape opening that slightly protrude upward in direction away from the platform 65 body that respectively corresponds with the quadrilateral formation of the pulsator 21 spring induction hole(s) 15 envisioned to houses the lower portion of the coil spring 51 that deviates and extends from the spring induction cap(s) 57 spring slot(s) 4. Further, the diameter of the platform 65 spring slot(s) 4 is marginally smaller than the overall diameter of the coil spring(s) 51, whereas in response will allocate the platform 65 spring slot(s) 4 to provide an snug fitting placement for the coil spring(s) 51 to arrange within. Further, the coil spring(s) 51 coupled within the spring induction cap(s) 57 spring slot(s) 4 and platform 65 spring slot(s) 4 overall body is enclosed by a rubber bearing. The rubber bearing may be the like(s) of a sleeve made of a rubber or silicone material. However, the load capacity sensing apparatus 20 comprises an circle shape base center hole 13 at the underside center region of the housing 27 thereof that slightly protrudes away from the body of the housing 27. Moreover, disposed below the outer drum 19 is an motor device 14 which traditionally generates an driving force in conjunction with an gear assembly 50 which may transfer the driving force of the motor device 14 to the inner drum 27 or to the pulsator 21 in response to the pulsator 21 being respectively coupled to the load capacity sensing component 20.

Referring to FIG. 4A-4G shows a view illustrating a top-loader washing/drying appliance 1, the appliance 1 may comprise the same components mentioned above in FIGS. 1A and 1B. Inversely, the pulsator 21 excludes the spring induction hole(s) 15, spring induction cap(s) 57 and spring slot(s) 4. Moreover, the pulsator 21 may comprises an respective base opening 42 at an center underneath region thereof, further the joining member 87 rotating shaft 59 is respectively introduced into the pulsator 21 base opening 42 which distributes the rotational force via the motor device 14 via the gear assembly 50 and rotating shaft 59 in return allocates the rotation of the pulsator 21.

Figure 4A:
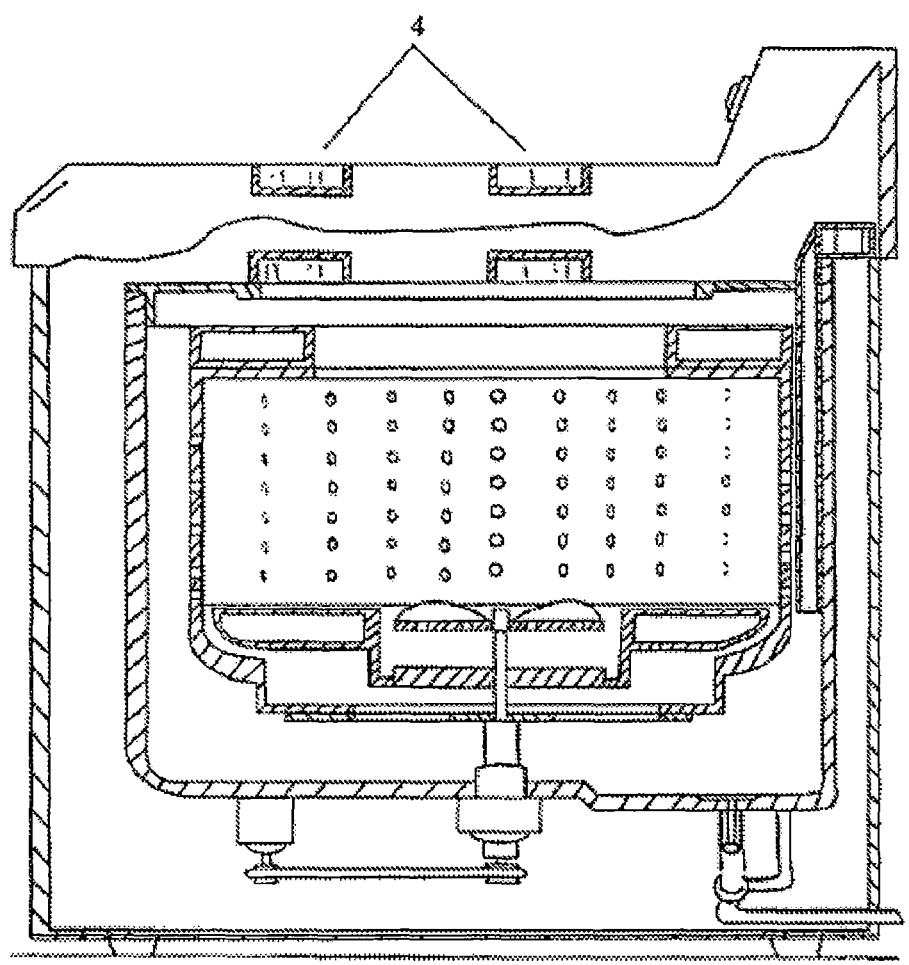

Further, the inner cabinet 10 comprises an plurality of spring slot(s) 4 at an upper inner region thereof, the spring slot(s) 4 are arranged as two at the front region at opposing sides and two at the rear region at opposing sides of the cabinet 10 for coupling the top region of the outer drum 26 to the top region of the cabinet 10 by an coil spring 51 which allocates an upper flexibility and stability of the outer drum 19 during raising and lowering of the outer drum 19 according to one operational aspect of the present invention seen in FIG. 4A.

Additionally, the cabinet 10 comprises a T-shape rear shield 92 coupled to the rear of the cabinet 10 which protects the internal components of the cabinet 10. More specifically, the rear shield 92 comprises an plurality of openings 64 throughout predetermine regions of its circumferences, envisioned to allocate coupling the rear shield 92 to the cabinet 10 and the bottom frame 67 and rail(s) 32 to an predetermine region of the rear shield 92. The rear shield 92 further comprises two quadrilateral-shaped rail(s) placement 93 formed at an lower interior region at opposing sides that marginally protrudes away from the rear shield 92 body, envisioned to house the rail(s) 32. Further, the appliance 1 comprises two respective rail(s) 32 that forms an extending quadrilateral-shape body whereas an end region forms an partial curve, also the rail(s) 32 comprises an respective recessed threaded opening 30 formed at the butt of its body that respectively corresponds with the rear shield 92 rail(s) placement 93 opening 64 that allocates coupling to the rear shield 92 by an screw or bolt. The rail(s) 32 include a set of wheels 132 arranged at a bottom side of its body spaced within a predetermined distance from each other which allocates free movement during arranging the appliance 1. Further, each respective rail(s) 32 comprises two respective spring slot(s) 4 adjacent forming an circular opening that slightly extends upwardly in direction away from the rail(s) 32 spaced apart from each other at an predetermine region of its body for housing the coil spring(s) 51. More of, the base region of the cabinet 10 includes an quadrilateral-shape bottom frame 67 coupled to an hindmost bottom region of the rear shield 92 arranged intermediate the two rail(s) placements 93 FIG. 4B-4D. Further, the bottom frame 67 overall circumference is approximately 6.35 mm to 7 mm thick.

The coil spring(s) 51 housed within the rail(s) 32 spring slot(s) 4 are coupled to the front and rear spring fin(s) 55, 89 at the lower region of the outer drum 19 which allocates bottom-end flexibility and stabilization during the raising and lowering of the outer drum 19. Further, the outer drum 19 comprises a cylinder shape body. In addition, the outer drum 19 has a plurality of recessed threaded openings 30 throughout its circumference which allocate the motor fin(s) 37, front and rear spring fin(s) 55, 89 and other components to respectively couple to its body thereon. Further, the outer drum 19 can be formed of a plastic based material by injection molding or the likes.

The motor fin(s) 37 and front and rear spring fin(s) 55, 89 forms the body of a fin/flapper of a sea animal such as a fish, shark, dolphin and turtle. The motor fin(s) 37 allocates an joining region at which the motor rod(s) 30 respectively raise and lower the outer drum 19 via the drum motor(s) 73 rotational force from an lower region of the cabinet 10, while the front and rear spring fin(s) 55, 89 allocates an joining region at which the rail 32 coil spring(s) 51 are respectively introduced into which allocates stability to the outer drum 19 during the washing operational cycle rotational force.

Specifically, the motor fin(s) 37 and front and rear spring fin(s) 55,89 comprises 180° angle parallel sides whereas both parallel sides curves inward to convene forming an partial curve at one end, while the opposing ends of both parallel sides marginally project upward in direction and convene at an straight 180° forming an 90° angle at the opposing end. The motor fin(s) 37 comprises an partial groove region 83 arranged within an predetermine region of its body that corresponds with the shape of the motor rod(s) 2 reedier end regions, so that the motor rod(s) 2 end region can assemble flush within the groove region 83. Further, the motor fin(s) 37 comprises an opening 64 slightly adjacent the curve end region edges and slightly adjacent the edge where the 90° angle is formed, whereas the region where the 90° angle is formed the motor fin(s) 37 is coupled to the outer drum 19 by an screw or bolt, and the region where the curved end is formed the motor fin(s) 37 is coupled to the motor rod(s) 30 by an screw or bolt.

Rationally, the front and rear spring fin(s) 55, 89 comprises an spring slot(s) 4 forming an circular opening that slightly extends downwardly away from the front and rear spring fin(s) 55, 89 at an underneath region slightly adjacent the curve end region edges which allocates the rail(s) 32 coil spring(s) 51 to introduce thereon, whereas the region where the 90° angle is formed the front and rear spring fin(s) 55, 89 comprises an opening 64 which allocates coupling the front and rear spring fin(s) 55, 89 to the outer drum 19 by an screw. In conjunction, the motor fin(s) 37 are arranged intermediate the front and rear spring fin(s) 55, 89 on opposing sides of the outer drum 19 at an predetermine mid lower region of the outer drum 19 FIG. 4E. Further, the spring fin(s) 55, 89 and motor fin(s) 37 can also be formed of a plastic based material by injection molding or the likes.

Further, the coil spring(s) 51 coupled within the outer drum 19 front and rear spring fin(s) 55 89 spring slot(s) 4 and rear shield 92 rail(s) 32 spring slot(s) 4 overall body is enclosed by a rubber bearing. The rubber bearing may be the like(s) of a sleeve made of a rubber or silicone material.

The inner region of the cabinet 10 includes an assembly system 28 respectively coupled to and predetermine region of the rear shield 92 intermediate the rail(s) 32 of the rear shield 92. The assembly system 28 includes a base 76 portion forming a quadrilateral body, comprising a plurality of recessed threaded holes 30 at its top region which allocates coupling the load capacity sensing apparatus 20 to the base 76 region, and a limb member(s) 66 portion similar to a rod(s) or the likes. The limb member(s) 66 forms an elbow-shape comprising an opening 64 at its upper bend region which allocates coupling to the base 76, whereas the opposing lower bend region comprises an opening 64 which allocate introduction of an screw or bolt for coupling the limb member(s) 66 to an predetermine region intermediate the rail(s) 32 of the bottom frame 67 FIG. 4A-4G.

Figure 4C:
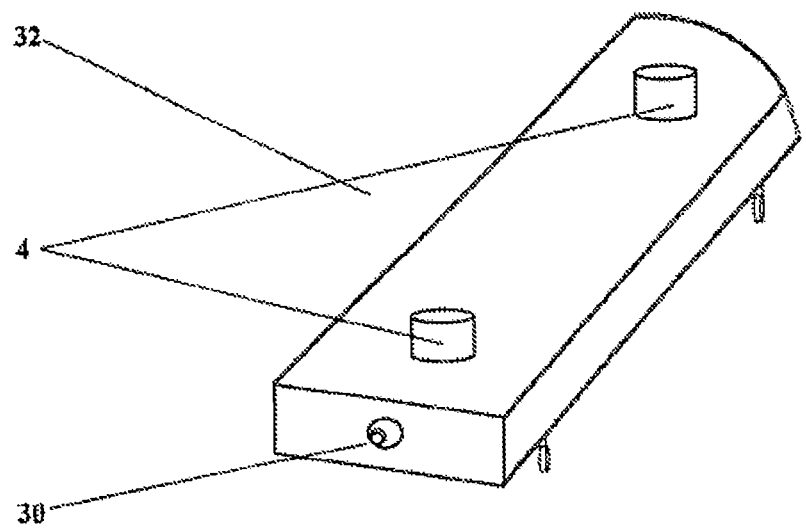
Figure 4D:
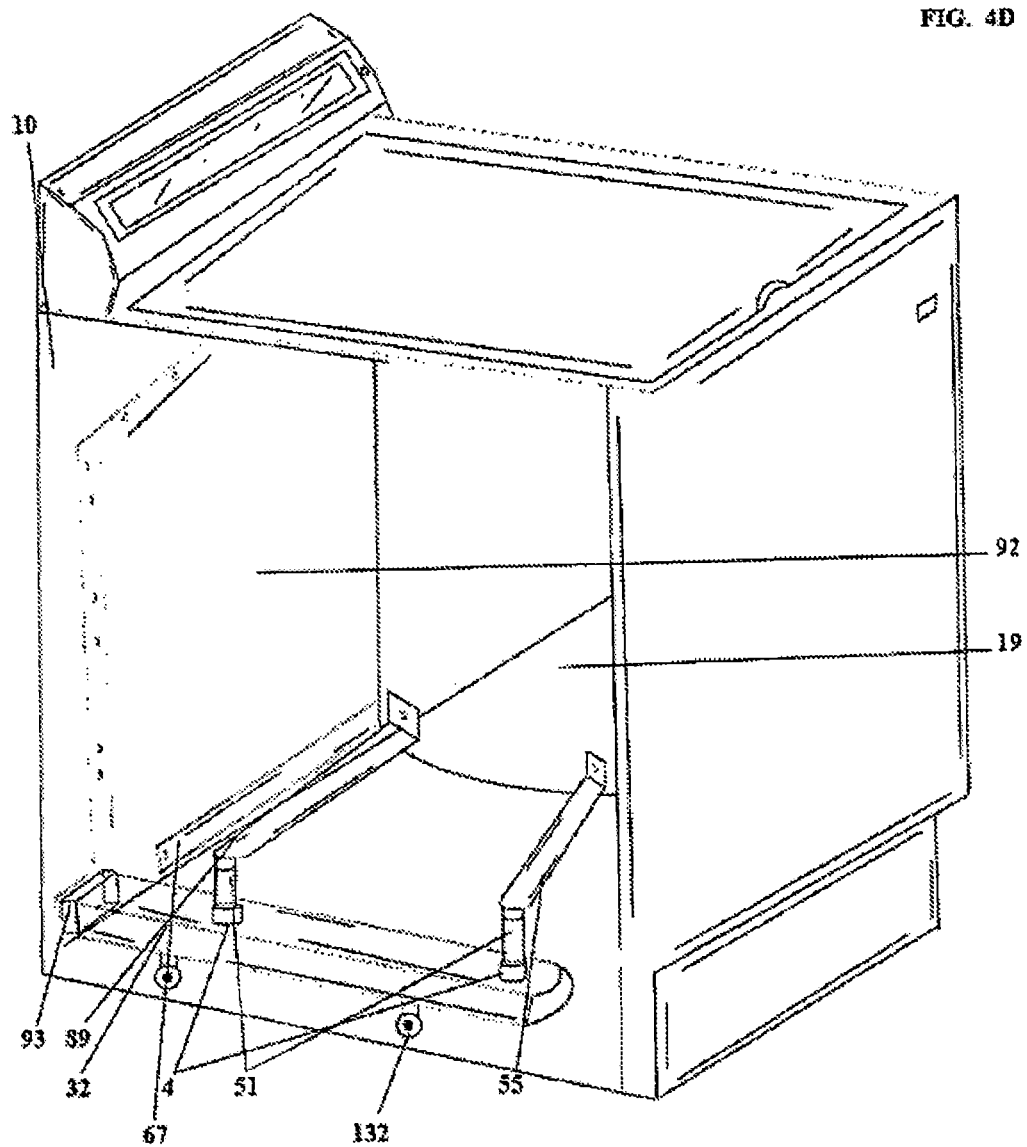
Figure 4E:
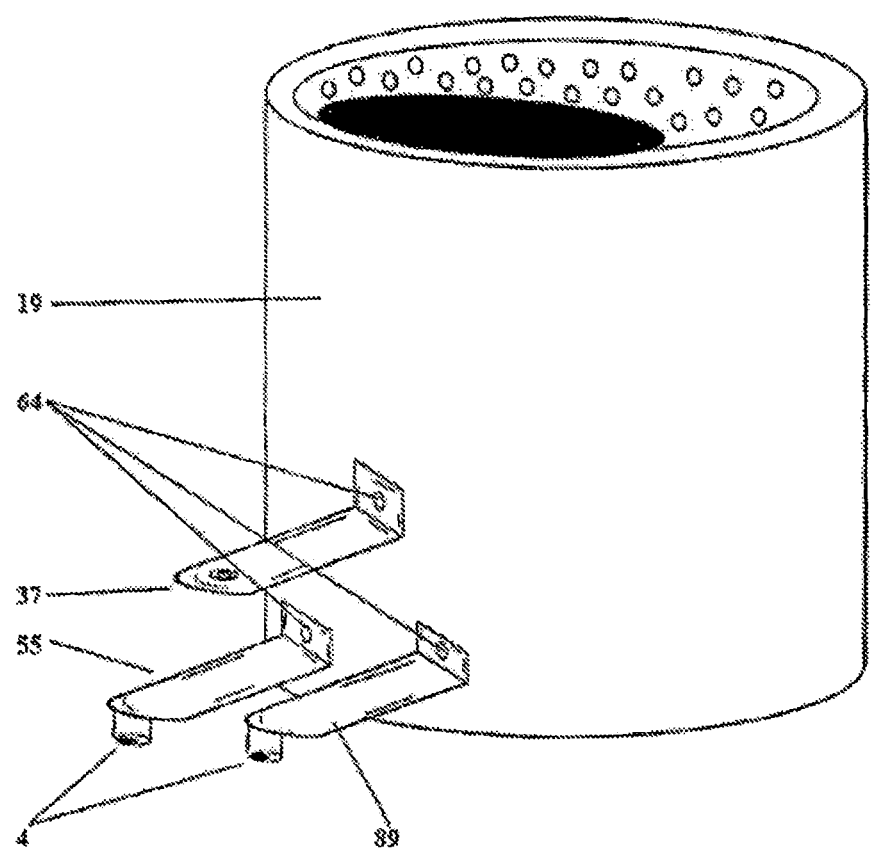
Figure 4F:
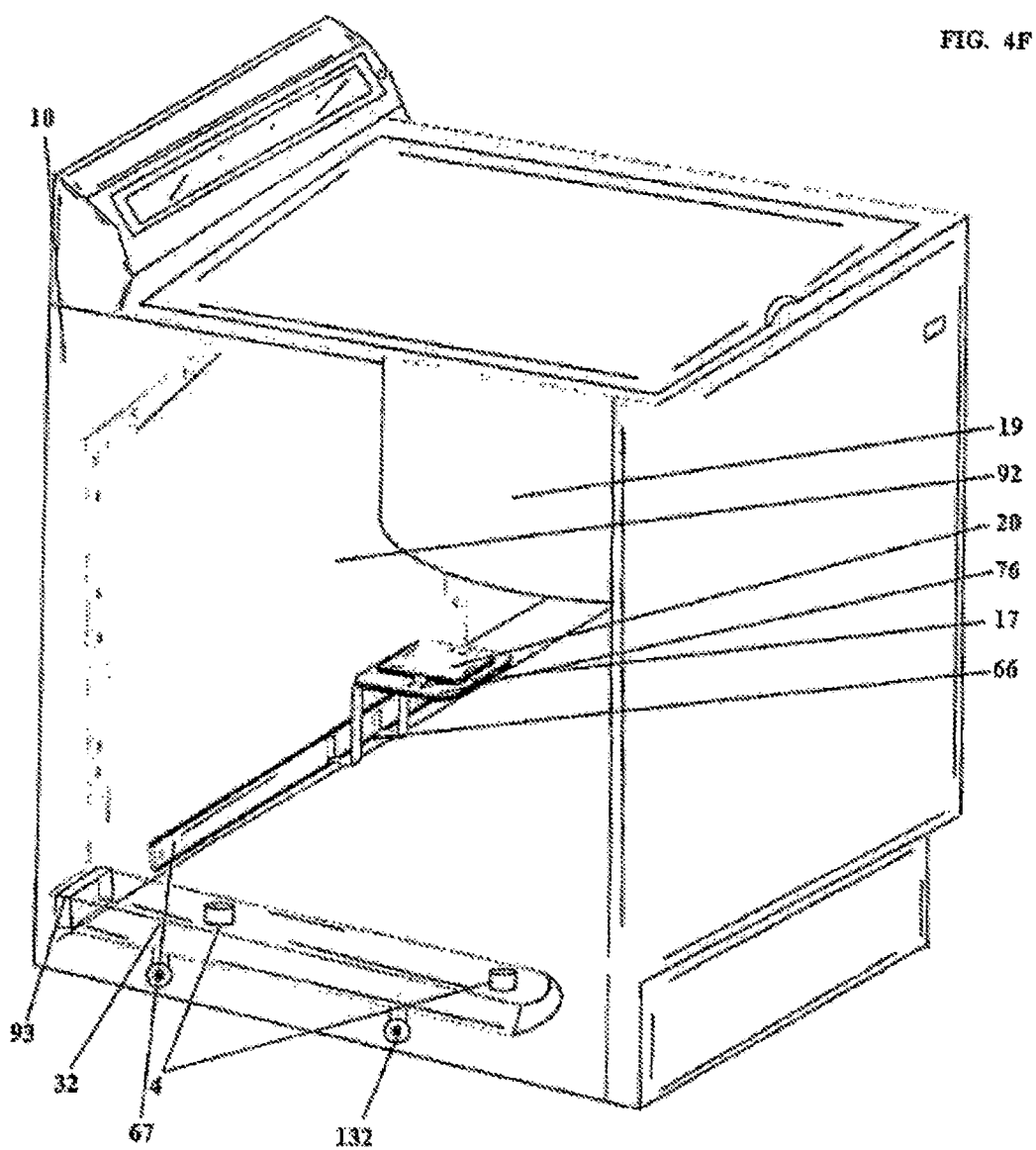
Figure 4G:
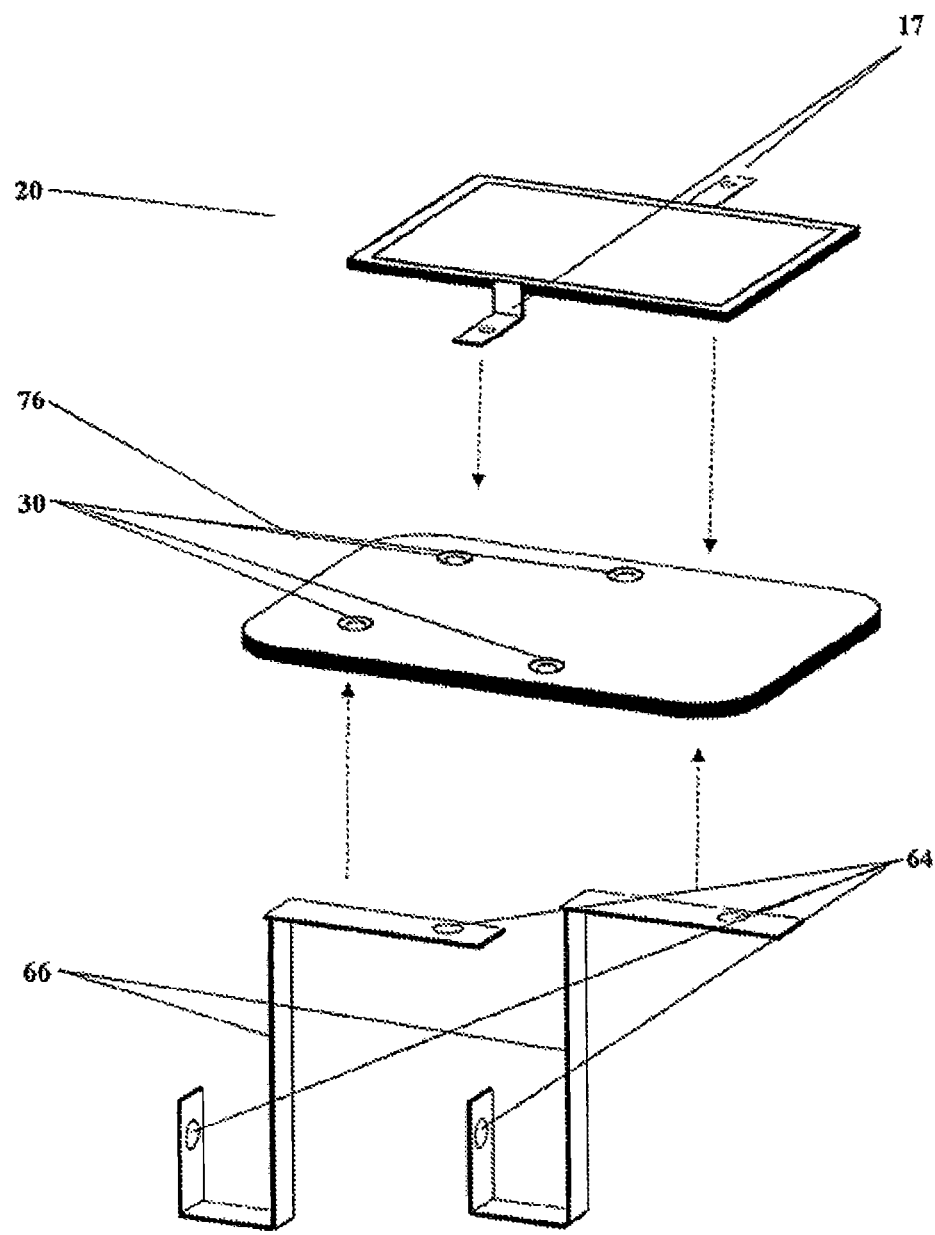

Signifying, the load capacity sensing apparatus 20 may operate and configure as mentioned in FIG. 2 & FIG. 4F. Differently, the load capacity sensing component 20 housing 27 comprises two respective L-shape extending segments 17 disposed at opposing sides of the housing 27, including an opening 64 at one predetermine region of the extending segment(s) 17 envisioned to introduce an screw or bolt to an recessed threaded opening of the load capacity sensing apparatus 20 base 76 portion. The load capacity sensing apparatus 20 extending segments 17 are made of an aluminum material.

Figure 5A:
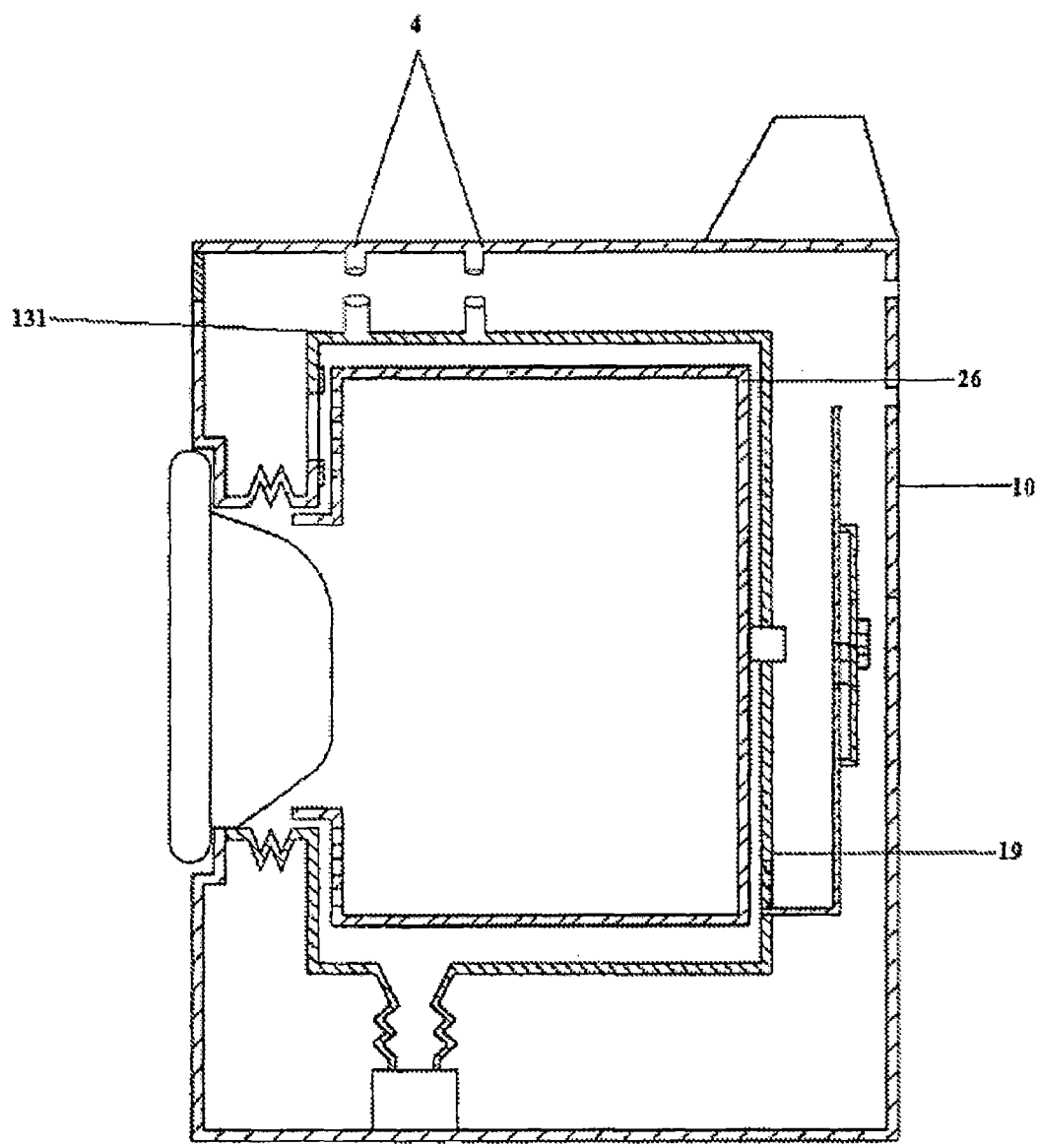
FIG. 5A-5C is an perspective view of the appliance according to another embodiment.
Figure 5B:
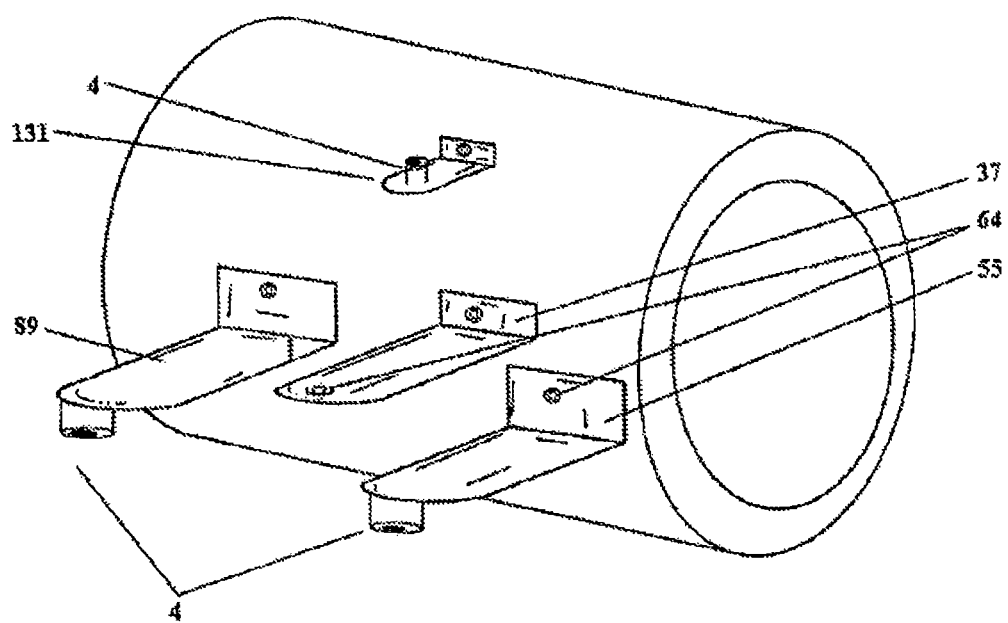
Figure 5C:
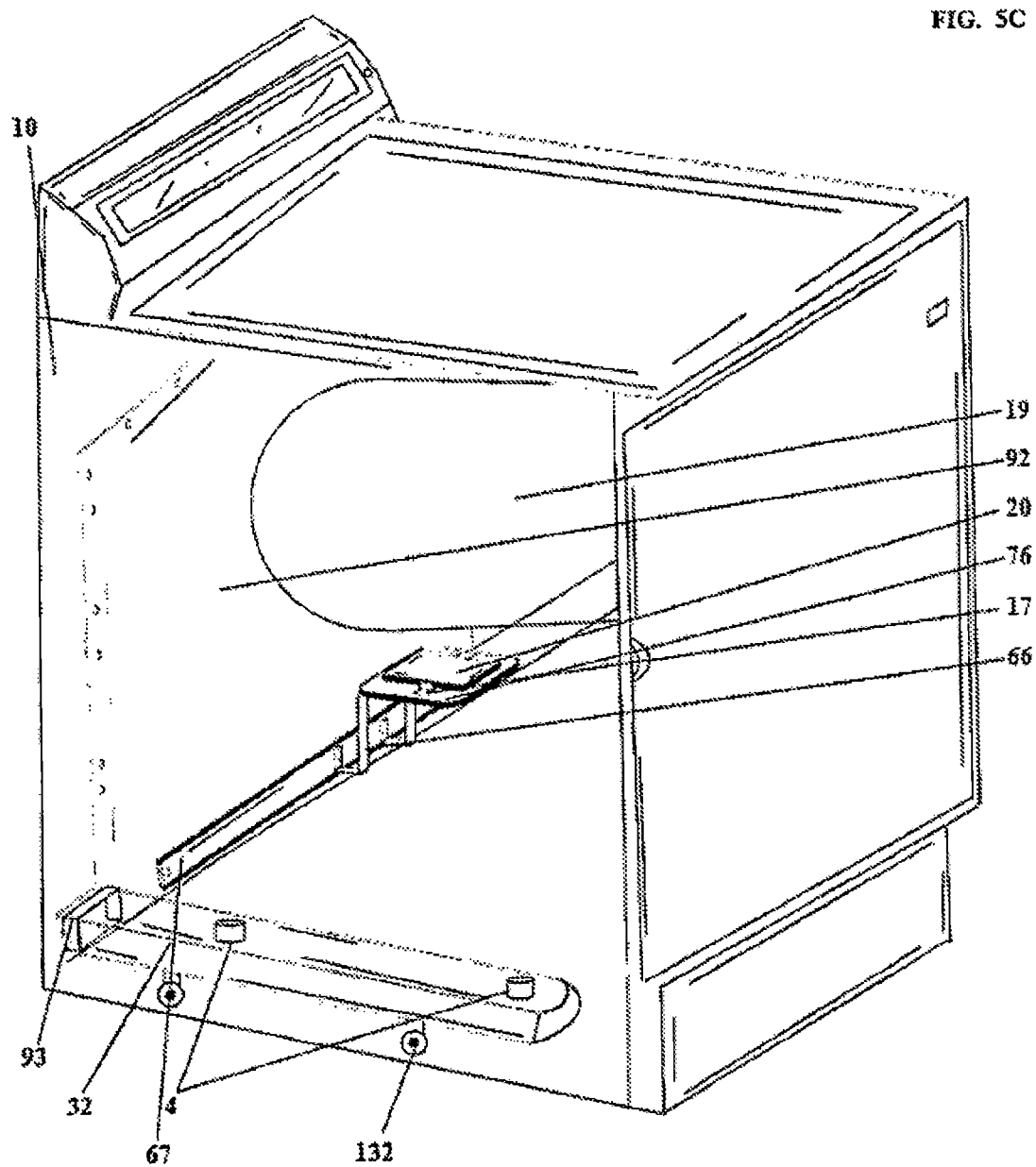

Referring to FIG. 5A-5C is a view illustrating a front-loader washing/drying appliance 1, the appliance 1 may comprise the same components as mentioned above in FIGS. 1A, 1B and 2. Accordingly, the appliance 1 consists of a cabinet 10 comprising at least one laundry entrance such as an door arranged at its front-side to allocate an user to insert articles into the laundry entrance. The appliance 1 comprises an outer drum portion 19 (e.g., such as the tub) disposed horizontally within the cabinet 10 which may traditionally store water and washing liquid therein, and an inner drum portion 26 (e.g., such as the drum) comprising an plurality of discharging holes 46 provided within the outer drum portion 19, and an motor device 14 coupled to the outer drum 19 but within the cabinet 10 for generating a driving force to the inner drum 26 rotating shaft 74 via an belt 5. Further, the appliance 1 may comprise other components and developments as mentioned above.

Moreover, the inner cabinet 10 comprises an plurality of spring slot(s) 4 at an upper inner region thereof, the spring slot(s) 4 are arranged at an predetermine mid region at opposing sides of the cabinet 10 for coupling the top region of the outer drum 26 to the cabinet 10 by an coil spring 51 which allocates an upper flexibility of the outer drum 19 during raising and lowering of the outer drum 19 in respect to the electric motor(s) 68 according to an operational aspect of the present invention as shown above in FIG. 5C.

Further, the cabinet 10 comprises a T-shape rear shield 92 coupled to the rear of the cabinet 10 which protects the internal components of the cabinet 10. Specifically, the rear shield 92 comprises an plurality of openings 64 throughout predetermine regions of its circumferences, envisioned to allocate coupling the rear shield 92 to the cabinet 10 and the bottom frame 67 and rail(s) 32 to an predetermine region of the rear shield 92. The rear shield 92 further comprises two quadrilateral-shaped rail(s) placement 93 formed at an lower region at opposing sides that marginally extends away from the rear shield 92 body, envisioned to house the rail(s) 32. Further, the rail(s) 32 forms an quadrilateral-shape body whereas the end regions forms an partial curve, also the rail(s) 32 comprises an recessed threaded opening 30 formed at the butt of its body that respectively corresponds with the rear shield 92 rail(s) placement 93 opening 64 that allocates coupling to the rear shield 92 by an screw. The rail(s) 32 include a set of wheels 132 arranged at a bottom side of its body spaced within a predetermined distance from each other which allocates free movement during arranging the appliance 1. The rail(s) 32 further comprises two respective spring slot(s) 4 forming an circular opening that slightly extends upwardly in direction away from the rail(s) 32 spaced apart from each other at an predetermine region of its body for housing the coil spring(s) 51.

The base region of the cabinet 10 includes an quadrilateral-shape bottom frame 67 coupled to an hindmost bottom region of the rear shield 92, arranged intermediate the two rail(s) placements 93 as shown in FIGS. 4B-4D. Further, the bottom frame 67 overall circumference is approximately 6.35 mm to 8.35 mm thick.

The coil spring(s) 51 housed within the rail(s) 32 spring slot(s) 4 are coupled to the front and rear spring fin(s) 55, 89 at the lower region of the outer drum 19 which allocates bottom-end flexibility and stabilization during the raising and lowering of the outer drum 19. The coil spring(s) 51 housed by the rail(s) 32 are coupled to the front and rear spring fin(s) 55, 89 at the lower region of the outer drum 19 which allocates bottom-end flexibility and stabilization during the raising and lowering of the outer drum 19 as seen in FIG. 4A.

The outer drum 19 comprises a cylinder shape where predetermine regions of its body is recessed and protruding. The outer drum 19 has a plurality of recessed threaded openings 30 throughout its circumference which allocate the joining spring slot(s) 131, front and rear spring fin(s) 55, 89 and motor fin(s) 37 and other components to respectively couple to its body thereon. Further, the outer drum 19 can be formed of a plastic based material by injection molding or the likes.

The joining spring fin(s) 131 motor fin(s) 37 and front and rear spring fin(s) 55, 89 forms the body of a fin/flapper of a sea animal such as a fish, shark, dolphin and turtle. The motor fin(s) 37 allocates an joining region at which the motor rod(s) 30 respectively raise and lower the outer drum 19 via the drum motor(s) 73 rotational force from an lower region of the cabinet 10, while the front and rear spring fin(s) 55, 89 allocates an joining region at which the rail 32 spring(s) 51 are respectively introduced into which allocates stability to the outer drum 19 during the washing operational cycle rotational force and the joining spring fin(s) 131 allocates an joining region at which the outer drum is respectively coupled to an predetermine region of the cabinet 10.

Specifically, the joining spring fin(s) 131 motor fin(s) 37 and front and rear spring fin(s) 55, 89 comprises 180° angle parallel sides whereas both parallel sides curves inward to convene forming an partial curve at one end, while the opposing ends of both parallel sides marginally project upward in direction and convene at an straight 180° forming an 90° angle at the opposing end. The motor fin(s) 37 comprises an partial groove region 83 arranged within an predetermine region of its body that corresponds with the shape of the motor rod(s) 2 reedier end regions, so that the motor rod(s) 2 end region can assemble flush within the groove region 83. Further, the motor fin(s) 37 comprises an opening 64 slightly adjacent the curve end region edges and slightly adjacent the edge where the 90° angle is formed, whereas the region where the 90° angle is formed the motor fin(s) 37 is coupled to the outer drum 19 screw, and the region where the curved end is formed the motor fin(s) 37 is coupled to the motor rod(s) 30.

Rationally, the front and rear spring fin(s) 55 comprises an spring slot(s) 4 forming an circular opening that slightly extends away from the front and rear spring fin(s) 55 at an underneath region slightly adjacent the curve end region edges which allocates the rail(s) 32 spring(s) to introduce thereon, whereas the region where the 90° angle is formed the front and rear spring fin(s) 55, 89 comprises an opening 64 which allocates coupling the front and rear spring fin(s) 55, 89 to the outer drum 19 by an screw or bolt. In conjunction, the motor fin(s) 37 are arrange intermediate the front and rear spring fin(s) 55, 89 on opposing sides of the outer drum 19 at an lower region of the outer drum 19.

The outer drum 19 comprises a joining spring fin(s) 131 coupled to an upper-mid predetermine region which allocates coupling the outer drum 19 to a predetermined region of the cabinet 10. Further, the joining spring fin(s) 131 further comprises an spring slot(s) 4 arranged at an predetermine upper region, that forms an circular opening that marginally extends away from the joining spring fin(s) 131 body slightly adjacent the curve end region edges, which allocates an coil spring(s) 51 to introduce within the cabinet 10 spring slot(s) 4 and joining spring fin(s) 131 spring slot(s) 4, whereas the region where the 90° angle is formed the joining spring fin(s) 131 comprises an opening 64 which allocates coupling the joining spring fin(s) 131 to the outer drum 19 by an screw or bolt.

Further, the joining spring fin(s) 131, motor spring fin(s) 37 and front and rear spring fin(s) 55, 89 can also be formed of a plastic based material by injection molding or the likes. Further, the coil spring(s) 51 coupled within the outer drum 19 front and rear spring fin(s) 55, 89 spring slot(s) 4 and bottom frame 67 rail(s) 32 spring slot(s) 4 overall body is enclosed by a rubber bearing. The rubber bearing may be the like(s) of a sleeve made of a rubber or silicone material.

Moreover, the inner region of the cabinet 10 includes an assembly system 28 respectively coupled to a predetermined region intermediate the rail(s) 32 of the lower frame 67. The assembly system 28 includes a base 76 portion forming a quadrilateral body, comprising a plurality of recessed threaded holes 30 at its top region which allocates coupling the load capacity sensing apparatus 20 to the base 76 region, and a limb member(s) 66 portion similar to a rod(s) or the likes. The limb member(s) 66 forms an elbow-shape comprising an opening 64 at its upper bend region which allocates coupling to the base 76, whereas the opposing lower bend region comprises an opening 64 which allocate introduction of an screw for coupling the limb member(s) 66 to an predetermine region intermediate the rail(s) 32 of the bottom frame 67 as seen in FIG. 5C.

The load capacity sensing component 20 housing 27 comprises an L-shape extending segments 17 disposed at opposing sides of the housing 27, including an opening 64 at one region of the extending segment(s) 17 envisioned to introduce a screw for coupling the load capacity sensing apparatus 20 to the base 76 portion.

According to FIG. 5C is a prospective view illustrating components of the front and top loading appliance which are coupled to the inner region of the cabinet 10 envisioned to raise and lower the outer drum 19 of the appliance according to one embodiment of the present invention. The appliance comprises multiple electric motor(s) 68 as the like(s) of a DC motor(s) (brushless). The electric motor(s) 68 comprises a case portion of an aluminum body that houses a plurality of components. Further, the electric motor(s) 68 are respectively couple to a predetermined lower region of the cabinet 10 arranged at opposing left and right sides. The inner portion of the electric motor(s) 68 case may include a mainboard/printed circuit-board couple to an area of the case. The mainboard may comprise an wiring portion whereas the wiring portion is coupled to an area of the mainboard/printed circuit-board to transmit an electrical current to the electric motor(s) 68 coil(s) hence the mainboard/printed circuit-board comprising coil member(s)

coupled to an predetermine region whereas an portion of the coil(s) are couple to the coil member to obtain an electrical current.

Further, the electric motor(s) 69 mainboard/printed circuit-board comprises an secondary wiring portion 135 whereas one end of the secondary wiring portion comprises an harness connector 35 intended to couple to an port on the appliance 1 printed circuit-board 25, in response to receiving an electrical signal(s) as to spin direction instructions or power signal(s) instructions (e.g., recharge electric motor(s) 68 battery) for purposes of controlling an aspect of the electric motor(s) 68 operation(s). The electric motor(s) 68 mainboard/printed circuit-board may further comprises sensors (ex. hall effect) that operate(s) to precisely control the timing, phase of the current(s) in the rotor coil(s) to optimize torque, conserve power, regulate speed, and apply braking of the shaft(s).

The electric motor(s) 68 housing comprises a stator portion for receiving a promoting an electromagnetic field. The inner portion of the case 111 includes a bearing support member which has an opening at on end that couples to an area of the inner case 111. The bearing support member houses the ball bearing at one opening end whereas the ball bearing comprises an opening at one end that allocates one end of the magnet shaft(s) to spin freely. Further, the rear region of the case 111 comprises an Y-shape segment 113 that slightly extends away from the case 111 body, whereas the lower region of the Y-shape segment 113 partially extends below the case, further comprising two opening(s) 64 at an predetermine upper region and an respective opening(s) 64 at an predetermine lower region of the Y-shape segment 113 that respectively corresponds with the cabinet 10 wall mount(s) 117 recessed threaded opening(s) 30, envisioned to allocate coupling to an predetermine region of the inner cabinet 10. The Y-shape segment 113 is made of a metal material.

Figure 6A:
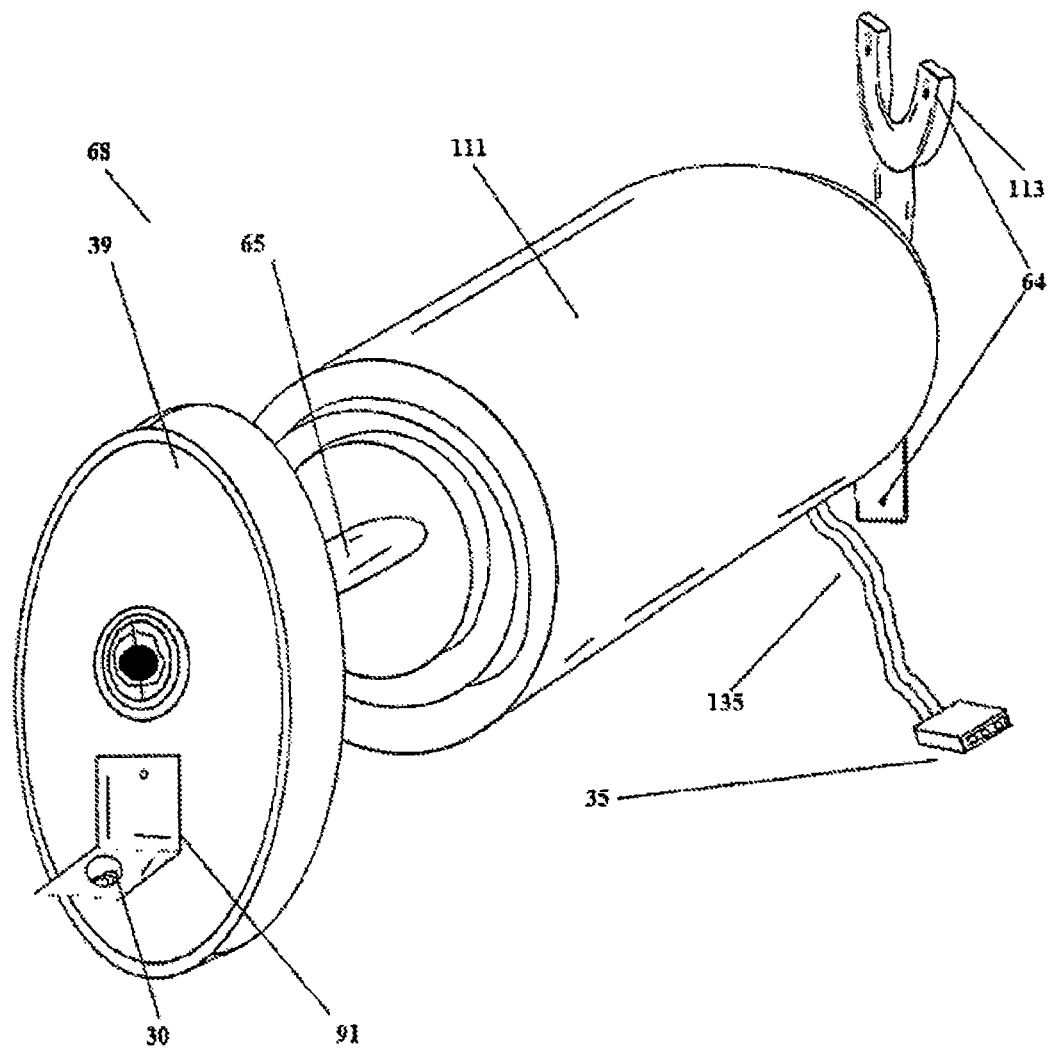
FIG. 6A-6B is an perspective view of component(s) of the inner drum according to one embodiment.
Figure 6B:
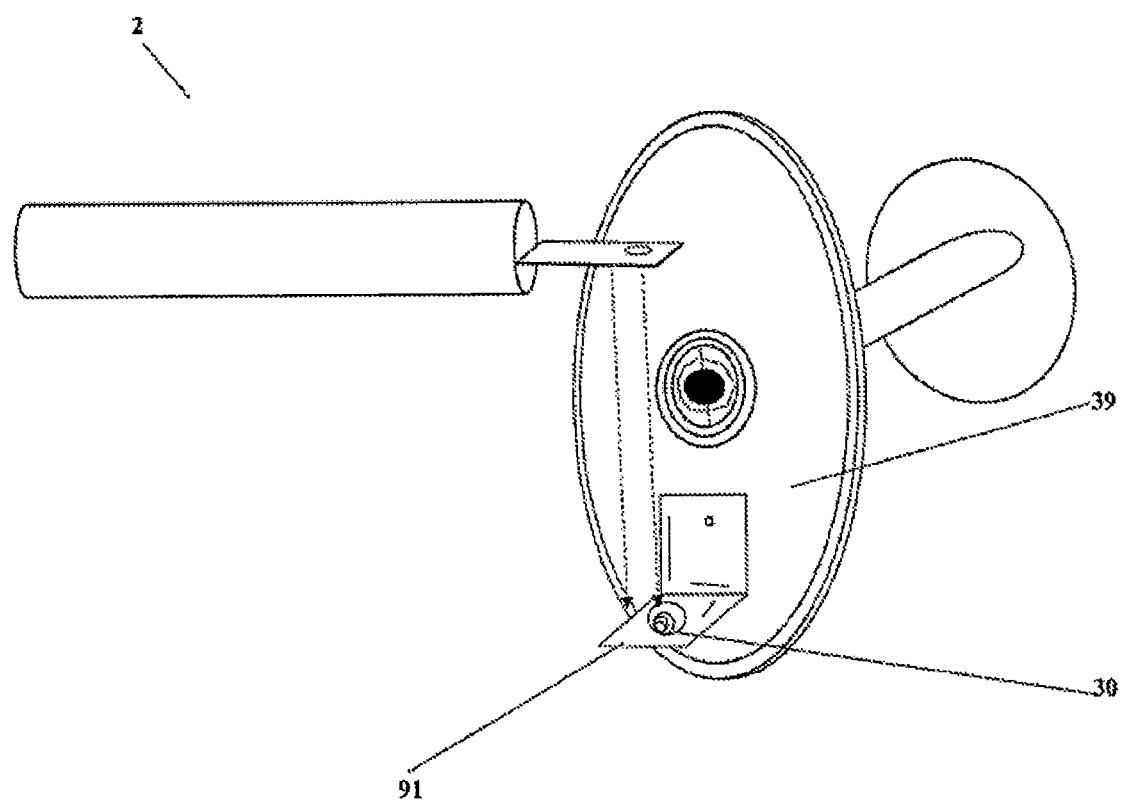

Further, the electric motor(s) 68 depiction shaft 65 comprises an circler wheel 39 coupled at an end of the depiction shaft 65, whereas the circler wheel(s) 39 comprises an L-shaped segment member 91 coupled to an predetermine outer region of its portion, furthering one end of the segment member(s) 91 slightly extends outward from the wheel(s) 39 body comprising an recessed threaded opening 30 for coupling the motor(s) rod(s) 2 to the wheel(s) 39 FIG. 6B.

Figure 7A:
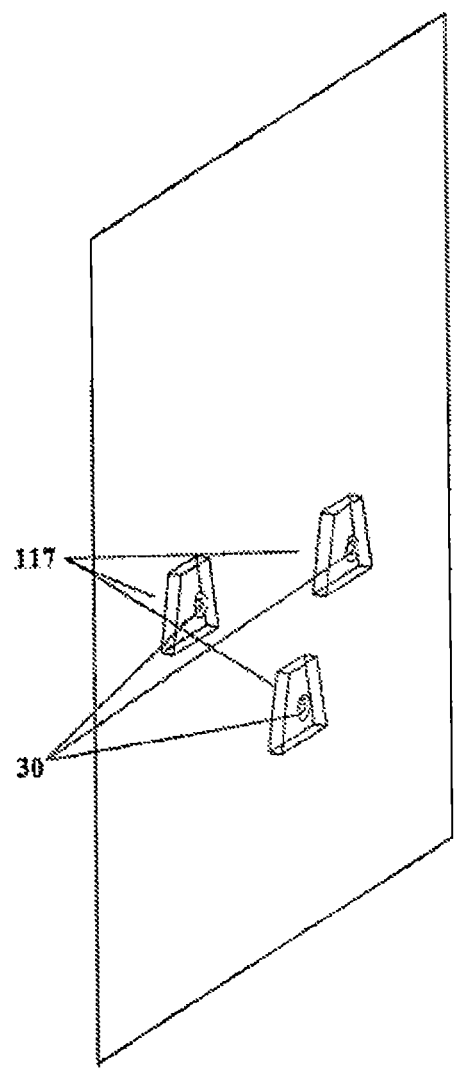
FIGS. 7A & 7B is an perspective view of component(s) of the inner cabinet according to one embodiment.
Figure 7B:
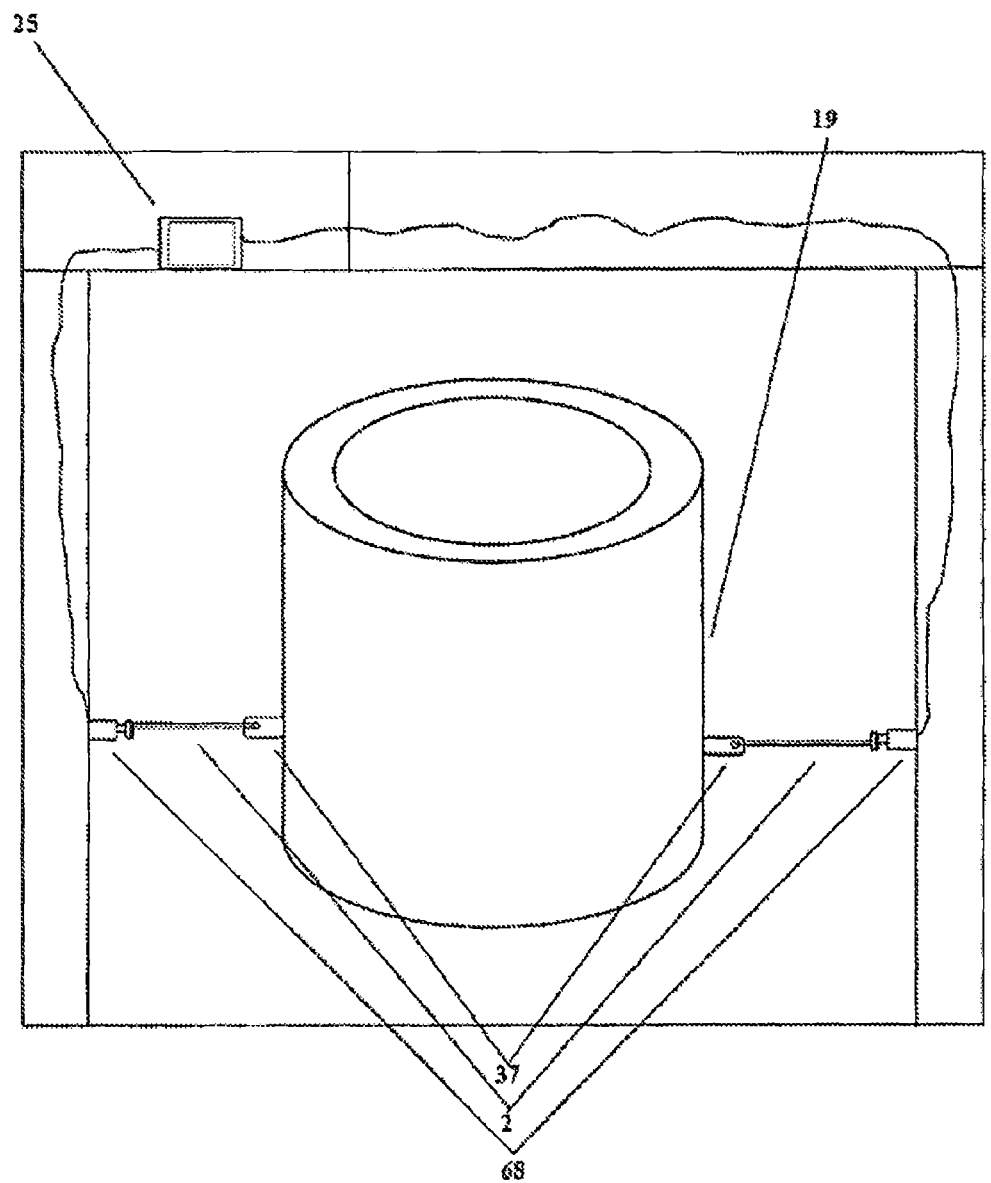

FIG. 7A-7B is an illustration describing coupling the electric motor(s) 68 within a predetermined region of the appliance 1 cabinet 10 walls. Further, an predetermine lower side region of the inner cabinet 10 walls comprises an plurality of respective mount(s) 117 arranged at an Y-shape formation approximately 7 mm to 10 mm apart that corresponds with the electric motor(s) 68 segment 113 opening(s) 64. Specifically, each respective mount(s) 117 respectively form an trapezoid-shape that marginally extends inwardly away from the cabinet 100 walls, additionally the mount(s) 117 comprises an respective recessed threaded opening 30 at an midrange region which allocates coupling the electric motor(s) 68 to the mount(s) 117 FIG. 7A. Further, the mount(s) 117 can be formed during the manufacturing development of the cabinet 10 or the mount(s) 117 can be respectively welded to an predetermine region of the inner cabinet 10 or any other coupling method/process known to one skilled in the art(s). Additionally, the appliance 1 comprises an plurality of motor rod(s) 2 respectively coupled to the electric motor(s) 68 and motor fin(s) 37, which provides an component to distribute the rotational movement of the electric motor(s) 68 to the outer drum 19. The motor rod(s) 2 forms an straight body of an semi-tubular shape, whereas the end regions forms an quadrilateral-shape reedier than the semi-tubular shape region that slightly extends away from the semi-tubular region, further arranging an opening 64 at an predetermine region of the quadrilateral-shape region, envisioned to couple the motor rod(s) 2 to the electric motor(s) 68 via the segment member(s) 91 and outer drum 19 via the motor fin(s) 37 FIG. 7B. The motor(s) rod(s) 2 are made of a metal material.

Figure 8:
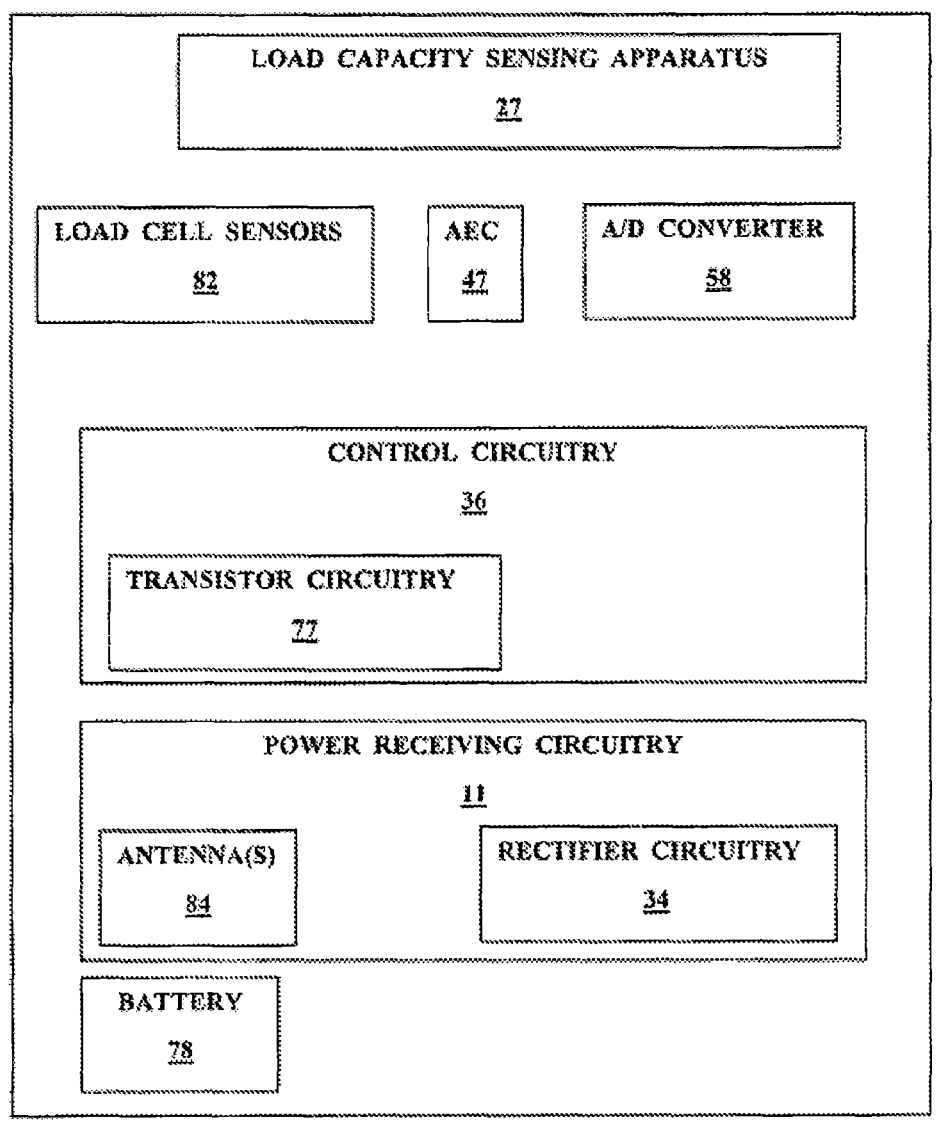
FIG. 8 is an perspective view of the load capacity sensing component according to one embodiment.

Referring to FIG. 8 is a block diagram of the load capacity sensing apparatus, further the load capacity sensing apparatus comprises an quadrilateral-shape housing 27

Further, the load capacity sensing apparatus 20 analog signal may be input into a conventional analog electronic circuitry for a signal calibration or amplification and the likes for conditioning a sensed analog signal. The processed analog signal may be output from the AEC (Analog Electronics Module) 47 for input into analog format to the digital converter 58 for converting the analog format into a digital format. The load sensing capacity apparatus 20 further comprises an control circuitry 36 disposed within its housing 27 and operates in response to the Analog/Digital (A/D) converter 58 which provides digitized sensor input data from the load cell sensor(s) 82 for generating a digital signal input to the appliance 1 control circuitry to display an load capacity number value on the appliance 1 display.

The control circuitry 36 may be used in controlling the operation of the load capacity sensing apparatus 20.

The control circuitry 36 may include a processing circuitry associated with microprocessors, power management units and/or applications—specific integrated circuits with processing circuits. For example, the processing circuitry may be used in determining processing sensor data (load cell sensors), handling negotiations between the load capacity sensing apparatus 20 and the appliance 1 control circuitry and processing other information and using this information to adjust one or more operation of the washing or drying cycles of the appliance. The control circuitry 36 may be configured to perform operations in the load capacity sensing apparatus 1 using hardware, firmware and/or software. Software codes for performing operations in the load capacity sensing apparatus 20 is stored on non-transitory computer readable storage media (e.g., tangible computer readable storage media) in the control circuitry 36.

The software codes may sometimes be referred to as software, data, program instructions, instructions, or code. The non-transitory computer readable storage media may include non-volatile memory such as nonvolatile random-access memory (NVRAM) or the likes. The software stored on the non-transitory computer readable storage media may be executed on the processing circuitry of the control circuitry 36.

The processing circuitry may include application-specific integrated circuits with processing circuitry, one or more microprocessors, a central processing unit (CPU) or other processing circuitry.

The load capacity sensing apparatus 20 control circuitry 36 may be used to run software, such as applications and operating system functions, etc. To support interactions with external equipment, the control circuitry 36 may be used in implementing communications protocols. For, instance the control circuitry 36 may comprises an application or software that obtains the digital signal via the Analog/Digital (A/D) converter 58 and converts the encrypted data into an actual number value, in response the application or software control circuitry 36 may distribute the number value to the appliance control circuitry to be stored in its memory or shown on the display.

The communications protocols that may be implemented using the control circuitry 36 includes internet protocols, wireless local area network protocols (e.g., IEEE 802.11 protocols—sometimes referred to as Wi-Fi®).

The load capacity sensing apparatus 20 may comprises an power receiving circuitry 11 which obtains radio frequency signals via the antenna 84 and harvest wireless power via the radio-frequency signals using the rectifier circuitry 34, this may be possible by the appliance 1 comprising an power transmitting circuitry.

The load capacity sensing apparatus 20 comprises a rectifier circuitry 34 that converts received radio-frequency signals (sometimes referred to as wireless power signals or wireless charging signals) from the antenna 84 into DC voltage signals for powering the load capacity sensing apparatus 20. DC voltages produced by the rectifier circuitry 34 can be used in powering the battery 78 and can be used in powering other components in the load capacity sensing apparatus 20.

The load capacity sensing apparatus 36 comprises a transceiver circuitry 77 that may handle 2.4 GHz and 5 GHz bands for Wi-Fi® (IEEE 802.11) communications and may handle 2.4 GHz Bluetooth® communications band. The transceiver circuitry 77 may handle wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 MHz or other communications bands between 600 MHz and 4000 MHz or other suitable frequencies. The transceiver circuitry 77 may handle non-voice data. For instance, the transceiver circuitry 77 may include a circuitry for obtaining radio signals, paging system transceivers, near field communications (NFC) circuitry, etc. Further, in Wi-Fi® and Bluetooth® links and other short-range wireless links, wireless signals can be typically used to convey data over a suitable distance according to feet. In other long-range links, wireless signals can be typically used to convey data over thousands of feet or miles. The transceiver circuitry 77 may also handle communications of wireless charging signals at any desired frequency (e.g., 900 MHz, between 850 and 950 MHz, between 800 and 1000 MHz, greater than 500 MHz, less than 400 MHz, 2400 MHz, between 2400 and 2500 MHz, 5 GHz, between 5000 MHz and 6000 MHz, between 500 MHz and 6000 MHz, or any other desired frequency).

The load capacity sensing apparatus 20 antennas 84 may be formed using any suitable antenna types. For instance, the antennas 84 may include antennas with resonating elements that are formed from stacked patch antenna structures, loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. Alternatively, one or more of the antennas 84 may be cavity-backed antennas. Different types of antennas may be used for different bands and combinations of bands. For instance, one type of antenna may be used to form a local wireless link antenna and an opposing type of antenna may be used in forming a remote wireless link antenna. Further, dedicated antennas may be used for receiving satellite navigation system signals or, if desired, the antennas 84 can be configured to receive both satellite navigation system signals and signals for other communications bands (e.g., wireless local area network signals). The antennas 84 can include one or more antennas for handling transfer of wireless power signals as well.

Further, the load capacity sensing apparatus 20 and appliance 1 control circuitry may communicate wirelessly using in-band or out-of-band communications. The appliance 1 may comprises a control circuitry further comprising a wireless transceiver circuitry to wirelessly transmit out-of-band signals (e.g., radio-frequency signals at a different frequency from wireless power signals) to the load capacity sensing apparatus 20 using an antenna. The appliance 1 wireless transceiver circuitry may be used to wirelessly receive out-of-band signals from the load capacity sensing apparatus 20 via an antennas. The load capacity sensing apparatus 20 may use the wireless transceiver circuitry 25 to transmit out-of-band signals to the appliance 1 control circuitry. The receiver circuitry in the wireless transceiver 25 may use an antenna to receive out-of-band signals from the appliance 1 control circuitry. Although the preceding description contains significant detail, it should not be constructed as limiting the scope of the invention but rather as providing illustrations of the preferred embodiments of the invention. Thus, the scope of the invention should be fixed by the following claims rather than any specific examples provided.

What is claimed is:

1. A appliance for sensing a load capacity of a inner drum comprising:
    a pulsator having one or more spring induction holes, and wherein the one or more spring induction holes is formed of a shape;
    a spring induction cap disposed within the one or more spring induction holes, and wherein the spring induction cap comprises a spring slot extending from the spring induction cap body configured to house a coil spring, and wherein the spring slot is formed of a shape; and
    an load capacity sensing apparatus having a platform, and wherein the platform comprises a plurality of spring slots formed of a shape extending from the platform, and wherein the plurality of spring slots is configured to communicable couple the load capacity sensing apparatus to the pulsator by receiving the coil springs deviating the spring induction cap spring slot;
    wherein the appliance is configured such that during operations of washing and/or drying cycles a gear assembly distributes rotational force from a motor device to the pulsator, and wherein the rotational force is distributed to the pulsator via a load capacity sensing apparatus rotating shaft communicable coupled to a base center hole formed on the load capacity sensing component;
    wherein the appliance is configured such that when the pulsator flexes downward in motion in response to sensing a force from a objected placed in the inner drum, and wherein the force applied to the pulsator is applied to the load capacity sensing apparatus in response to the coil spring constituting a compressed state, and wherein the load capacity sensing apparatus is configured to generate and distribute a load capacity signal to the appliance controller in response to sensing the force from the pulsator in response to the pulsator sensing a force from the object placed in the inner drum.

2. The appliance of claim 1, wherein the one or more spring induction holes forms a quadrilateral formation around the a center hole.

3. The appliance of claim 1, wherein the one or more spring induction hole is formed as a quadrilateral, spherical or elliptical shape.

4. The appliance of claim 1, wherein the spring induction cap spring slot(s) is of a circular shape.

5. The appliance of claim 1, wherein the platform plurality of spring slots forms a circular shape.

6. The appliance of claim 1, further comprising the coil spring(s) coupling the spring induction cap spring slot(s) to the platform plurality of spring slot body is enclosed by a rubber bearing.

7. The appliance of claim 1, wherein the circle shape base center hole slightly protrudes away from a body of the housing.

8. The appliance of claim 1, wherein the appliance is a washing machine.

9. The appliance of claim 1, wherein the appliance is a drying machine.

10. The appliance of claim 1, wherein the appliance is a washer/dryer combination machine.

\* \* \* \* \*